United States Patent
Yamada et al.

(10) Patent No.: US 6,842,350 B2
(45) Date of Patent: Jan. 11, 2005

(54) DC-TO-DC CONVERTER WITH FLYBACK PERIOD DETECTOR CIRCUIT

(75) Inventors: Tomoyasu Yamada, Niiza (JP); Masaaki Simada, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/858,432

(22) Filed: Jun. 1, 2004

(65) Prior Publication Data

US 2004/0218405 A1 Nov. 4, 2004

Related U.S. Application Data

(63) Continuation of application No. PCT/JP02/12590, filed on Dec. 2, 2002.

(30) Foreign Application Priority Data

Dec. 3, 2001 (JP) ........................................ 2001-369270

(51) Int. Cl.[7] ............................................. H02M 3/335
(52) U.S. Cl. ................................ 363/21.16; 363/56.01; 363/21.12
(58) Field of Search ........................... 363/21.12, 21.16, 363/56.01, 97

(56) References Cited

U.S. PATENT DOCUMENTS

6,038,146 A * 3/2000 Luo et al. ................ 363/21.16
6,515,876 B2 * 2/2003 Koike et al. ............. 363/21.16
6,751,104 B2 * 6/2004 Qiao et al. ............... 363/21.16

FOREIGN PATENT DOCUMENTS

JP          09-140128          5/1997

* cited by examiner

*Primary Examiner*—Bao Q. Vu
(74) *Attorney, Agent, or Firm*—Woodcock Washburn LLP

(57) ABSTRACT

A dc-to-dc converter includes a transformer having a primary winding connected to an input rectifying and smoothing circuit via an FET or like switching device, and a secondary winding connected to an output rectifying and smoothing circuit. A resonance capacitor is connected in parallel with the switching device. A switch control circuit cyclically turns the switching device on and off so as to keep constant the output voltage of the output rectifying and smoothing circuit by feedback control. The switch control circuit drives the switching device in light load mode when a flyback voltage developed by the transformer terminates earlier than each clock pulse, and in heavy load mode, in which each on-off cycle of the switching device is longer than in the light load mode, when the flyback voltage terminates later than each clock pulse.

17 Claims, 14 Drawing Sheets

DC-TO-DC CONVERTER WITH FLYBACK PERIOD DETECTOR CIRCUIT

RELATED APPLICATION

This is a continuation of Application PCT/JP02/12590, filed Dec. 2, 2002, which claims priority to Japanese Patent Application No.2001-369270 filed Dec. 3, 2001.

BACKGROUND OF THE INVENTION

This invention relates generally to dc-to-dc converters which convert one unidirectional voltage into another and, more particularly, to a dc-to-dc converter relying on feedback control for such conversion.

The dc-to-dc converter of the type herein under consideration generally comprises a transformer having a primary winding connected to a dc power supply, and a secondary winding connected to a rectifying and smoothing circuit. Connected in series with the transformer primary, a semiconductor switching device such as a field-effect transistor is driven on and off under the direction of a switch control circuit which is responsive to outputs from both an output voltage detector circuit and a circuit that detects the current flowing through the switching device.

There are the following three known methods of driving the switching device:

1. Ringing Choke Converter (RCC):

The switching frequency grows higher with less power requirement by the load.

2. Pulse Duration Modulation (PDM) or Pulse Width Modulation (PWM):

The switching device is driven at a constant rate (repetition frequency) but closed for less periods of time with less power requirement by the load.

3. Fixed Nonconducting Period:

The switching device is open for a constant period of time and closed for a period depending upon the load. Since one switching cycle is the sum of one conducting period and one nonconducting period, the switching frequency is subject to les change than by the RCC method.

The RCC and fixed nonconducting period methods are alike in that the switching frequency rises under light load, as when the converter is in standby mode. With the switching device turned on and off a greater number of times for a given amount of power fed to the load, the converters operating by these known methods have incurred unnecessarily high switching losses under light load.

The switching frequency is set as high as, say, 100 kilohertz according to the PDM switching method, with a view to less transformer loss under normal load as well as to the need for a smaller transformer. The switching device is therefore driven at that high frequency under light load, too. Thus the PDM switching method is also poor in efficiency under light load.

Japanese Unexamined Patent Publication No. 9-140128 provide a solution to the problems possessed by all of the above more conventional switching methods, suggesting use of different switching frequencies for normal and light load. The switching frequency is made lower under light load for attainment of higher efficiency by reduction of switchings per unit length of time.

Although this known suggestion seems the most reasonable solution to the problem of how to improve converter efficiency under light load, difficulties have been encountered in automatically changing the switching frequency according to the load. Automatically changing the switching frequency requires, of course, an accurate detection of the load magnitude. As far as the applicant is aware, however, no circuit has yet been proposed that can accurately detect the load magnitude but that is simple enough in construction to be incorporated with a dc-to-dc converter without substantially adding to its manufacturing cost.

SUMMARY OF THE INVENTION

It is therefore an object of this invention to improve the efficiency of a dc-to-dc converter of the kind defined, particularly under light load.

Another object of the invention is to provide, in a dc-to-dc converter of the kind defined, simpler circuit means than heretofore for accurate detection of the power requirement of the load for on-off control of the switching device accordingly.

Stated in brief, the invention provides a dc-to-dc converter capable of translating a first dc voltage into a second for application to a load of variable power requirement. The dc-to-dc converter comprises a transformer or like inductance means connected via a switching device between a pair of dc terminals from which there is supplied a first dc voltage. The switching device is controllable to have alternating conducting and nonconducting periods for repeatedly interrupting the first dc voltage. A rectifying and smoothing circuit is connected to the inductance means for providing a second dc voltage to be applied to the load. A feedback circuit creates a feedback signal for holding the second dc voltage constant. A flyback circuit detector circuit is provided for ascertaining a period of time during which the inductance means is developing a flyback voltage. A conduction termination circuit is connected to the feedback circuit for determination of moments at which the conducting periods of the switching device are to be terminated. A switch control and mode select circuit is connected to the flyback period detector circuit, the conduction termination circuit, and the switching device, for driving the switching device in two different modes. The switch control and mode select circuit includes a pulse generator circuit for providing clock pulses. Also the switch control and mode select circuit has means for forming a first switch control signal for driving the switching device in first mode when the flyback voltage terminates earlier than each clock pulse, and forming a second switch control signal for driving the switching device in second mode, in which each on-off cycle of the switching device is longer than in the first mode, when the flyback voltage terminates later than each clock pulse.

In a preferred embodiment of the invention the switch control and mode select circuit comprises: (a) a capacitor connected to a constant-current regulator for generating a sawtooth voltage; (b) a comparator having a first input connected to the capacitor, and a second input connected to a source of a reference voltage, for generating a clock pulse each time a voltage across the capacitor builds up to the reference voltage; (c) a first discharge switch connected in parallel with the capacitor for causing the same to discharge under the control of the comparator; (d) an RS flip flop having a set input connected to the comparator and a reset input connected to the conduction termination circuit; (e) a first logic circuit having a first input connected to the comparator, and a second input connected to the flip flop, for providing an output signal that is high both during the durations of the clock pulses and when the flip flop is reset; (f) a second logic circuit having a first input connected to the first logic circuit, and a second input connected to the flyback period detector circuit, for providing an output signal that is high when the output signal of the first logic circuit is low and, at the same time, when the output signal of the flyback period detector circuit indicates the duration of the flyback voltage; (g) a second discharge switch connected in parallel with the capacitor for holding the same in a state of discharge in order to delay the commencement of subsequent charging, the second discharge switch having a control terminal connected to the second logic circuit; and (h) a third logic circuit having a first input connected to the first logic circuit, and a second input connected to the second logic circuit, for causing conduction through the switching device when the outputs from the first and the second logic circuit are both low.

Alternatively, the switch control and mode select circuit may comprise: (a) a capacitor connected to a current regulator for generating a sawtooth voltage; (b) a comparator having a first input connected to the capacitor, and a second input connected to a source of a reference voltage, for generating a clock pulse each time a voltage across the capacitor builds up to the reference voltage; (c) an RS flip flop having a set input connected to the comparator and a reset input connected to the conduction termination circuit; (d) a discharge switch connected in parallel with the capacitor and having a control terminal connected to the flip flop for causing the capacitor to discharge when the flip flop is set; and (e) a logic circuit having a first input connected to the flip flop, and a second input connected to the flyback period detector circuit, for causing conduction through the switching device when outputs from the flip flop and the flyback period detector circuit are both low.

Thus the switch control and mode select circuit drives the switching device in either of the two different modes depending upon whether the flyback voltage terminates earlier or later than each clock pulse. The clock pulses are utilized for two purposes: (a) the provision of reference moments with respect to which the duration of the flyback voltage is determined; and (b) the creation of the control pulses for the switching device. The switch control and mode select circuit is therefore simpler in construction than if separate means were provided for these purposes.

Another advantage arises from the fact that the pulse generator circuit limits the on-off cycle of the switching device in the first mode, preventing the cycle from becoming so short as to make the switchings unwarrantably high per unit length of time. The result is the higher efficiency of the dc-to-dc converter in the first mode.

The switching frequency is subject to change with the power requirement of the load in the second mode. The noise frequencies can then be dispersed for reduction of interference by noise.

The above and other objects, features and advantages of this invention will become more apparent, and the invention itself will best be understood, from a study of the following description and appended claims, with reference had to the attached drawings.

DESCRIPTION OF THE PREFERRED EMBODIMENTS

General

Figure 1:
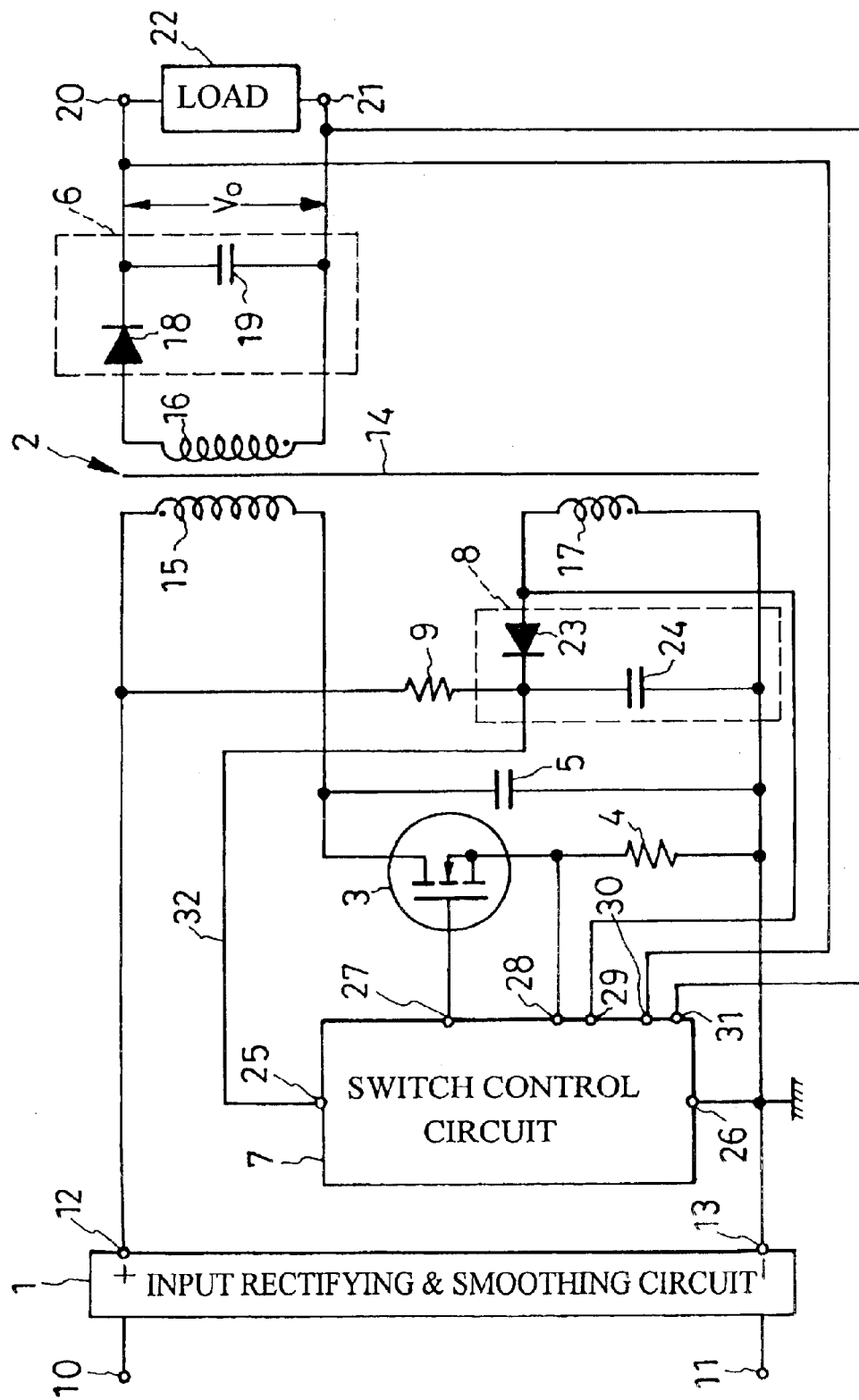
FIG. 1 is a schematic electrical diagram, partly in block form, of the dc-to-dc converter constructed according to the novel concepts of this invention.

The present invention is believed to be best embodied in the dc-to-dc converter illustrated in FIG. 1. More commonly known as the flyback switching regulator, the representative dc-to-dc converter comprises:

1. An input rectifying and smoothing circuit 1 having a pair of ac input terminals 10 and 11 for connection to a source of commercial ac power.
2. A transformer 2 having a primary winding 15 with its opposite extremities connected to the pair of opposite polarity output terminals 12 and 13 of the input rectifying and smoothing circuit 1.
3. A switching device 3, shown as an n-channel insulated-gate field-effect transistor, connected between one extremity of the transformer primary 15 and one output 13 of the input rectifying and smoothing circuit 1.
4. A resonance capacitor 5 connected in parallel with the switching device 3 via a current detect resistor 4 for the purposes of reduction of switching loss and noise.
5. An output rectifying and smoothing circuit 6 connected between the secondary winding 16 of the transformer 2 and a pair of converter output terminals 20 and 21 for applying a desired dc output voltage to a load 22 connected therebetween.
6. A switch control circuit 7 connected to the control terminal of the switching device 3 for driving the same at either of two different frequencies or repetition rates depending upon the power requirement of the load 22.

Connected to a commercial ac power supply, the input rectifying and smoothing circuit 1 puts out an unstabilized dc voltage. Other sources of dc voltage could be employed in place of the input rectifying and smoothing circuit 1, an example being a battery.

The transformer 2 has a tertiary winding 17 in addition to the noted primary 15 and secondary 16. All the three transformer windings 15–17 are coiled upon a magnetic core 14 and electromagnetically coupled to one another. The polarities of the transformer windings 15–17 are indicated by the dots in FIG. 1. Thus, for instance, the transformer primary 15 and secondary 16 are oriented in opposite directions in terms of polarity. The transformer primary 15 has leakage inductance. The transformer as inductance means conventionally operates to store energy during the conducting periods of the switching device 3 (hereinafter referred to simply as the switch) and release the stored energy during the nonconducting periods of the switch 3.

The FET constituting the switch 3 is conventionally equipped with a drain, a source, and a control gate. The drain is connected to the positive dc output terminal 12 of the input rectifying and smoothing circuit 1 via the transformer primary 15; the source to the grounded dc output terminal 13 of the input rectifying and smoothing circuit via the current detect resistor 4; and the gate to the switch control circuit 7 for on-off control of the switch 3.

Connected in parallel with the switch 3 via the current detect resistor 4, the resonance capacitor 5 has two important functions:

1. To cause the drain-source voltage $V_{DS}$ of the switch 3 to develop slowly when the switch 3 is turned off.
2. To make, by resonance, the drain-source voltage $V_{DS}$ of the switch 3 zero, or nearly so, immediately before the switch is turned on.

The resonance capacitor 5 is therefore materially less in capacitance than the standard smoothing capacitor, not shown, included in the input rectifying and smoothing circuit 6 or the smoothing capacitor 19 of the output rectifying and smoothing circuit 6. Notwithstanding the showing of FIG. 1, however, the provision of the capacitor 5 as a discrete unit will be unnecessary in cases where the stray capacitance between the drain and source of the switch 3 can serve its purposes.

The output rectifying and smoothing circuit 6 is shown as a combination of rectifying diode 18 and smoothing capacitor 19. The rectifying diode 18 is connected between one extremity of the transformer secondary 16 and one electrode of the smoothing capacitor 19. The rectifying diode 18 is so oriented as to be reverse biased by the voltage induced across the transformer secondary 16 when the switch 3 is closed, and forward biased by the voltage induced across the transformer secondary when the switch 3 is open. The smoothing capacitor 19 is connected in parallel with the transformer secondary 16 via the rectifying diode 18. The smoothing capacitor 19 also has its pair of electrodes connected respectively to the pair of converter output terminals 20 and 21, to which is to be coupled the load 22 of potentially variable power requirement.

The transformer tertiary 17 has its opposite extremities connected to the switch control circuit 7 via a control power supply circuit 8 for powering the same. Additionally, it serves for detection of flyback voltage in the transformer 2.

The control power supply circuit 8 comprises a rectifying diode 23 and smoothing capacitor 24. The smoothing capacitor 24 has one of its electrodes connected to one extremity of the transformer tertiary 17 via the rectifying diode 23. The other electrode of the smoothing capacitor 24, as well as the other extremity of the transformer tertiary 17, is connected to the grounded dc output terminal 13 of the input rectifying and smoothing circuit 1. The rectifying diode 23 is so oriented as to charge the smoothing capacitor 24 by being forward biased by the voltage induced across the transformer tertiary 17 when the switch 3 is open.

A starting resistor 9 is connected between the positive dc output terminal 12 of the input rectifying and smoothing circuit 1 and the control power supply circuit 8. The smoothing capacitor 24 of the control power supply circuit 8 is charged through the starting resistor 9 when power starts to be fed into the converter from its pair of ac input terminals 10 and 11 by the closer of the power switch, not shown, which is conventionally provided on either input or output side of the rectifying and smoothing circuit.

The switch control circuit 7 is shown in FIG. 1 as having eight terminals 25–31. These terminals are: (a) a supply terminal 25 connected to the control power supply terminal 8; (b) a grounding terminal 26 connected to the negative ac output terminal 13 of the input rectifying and smoothing circuit 1; (c) a control output terminal 27 connected to the control gate of the switch 3; (d) a current detect terminal 28 connected to one extremity of the current detect resistor 4; (e) a flyback voltage detect terminal 29 connected to one extremity of the transformer tertiary 17; and (f) a pair of converter output voltage detect terminals 30 and 31 connected respectively to the pair of converter output terminals 20 and 21 for detection of the converter output voltage $V_O$.

Functionally, the switch control circuit 7 of this particular embodiment is capable of attaining the following eight objectives:

1. To control the conducting periods of the switch 3 in order to make the converter output voltage $V_O$ constant, in response to the inputs from the current detect terminal 28 and output voltage detect terminals 30 and 31.
2. To make on-off control of the switch 3 at a constant repetition frequency when the converter is lightly loaded.
3. To drive the switch 3 in RCC mode when the converter is more heavily loaded.
4. To ascertain the periods when the transfer 2 is developing a fly-back voltage.
5. To generate a sawtooth voltage such that the sum of each positive-going period and each negative-going period of that sawtooth voltage is equal to one cycle of the constant repetition frequency at which the switch 3 is driven as above when the converter is lightly loaded.
6. To generate clock pulses in synchronism with the boundaries between the positive- and negative-going periods of the sawtooth voltage.
7. To decide whether the flyback voltage terminates before or after the clock pulses.
8. To drive the switch 3 at the constant repetition frequency if the flyback voltage terminates earlier than the clock pulses, and in RCC mode if the flyback voltage terminates later than the clock pulses.

Switch Control Circuit

Figure 2:
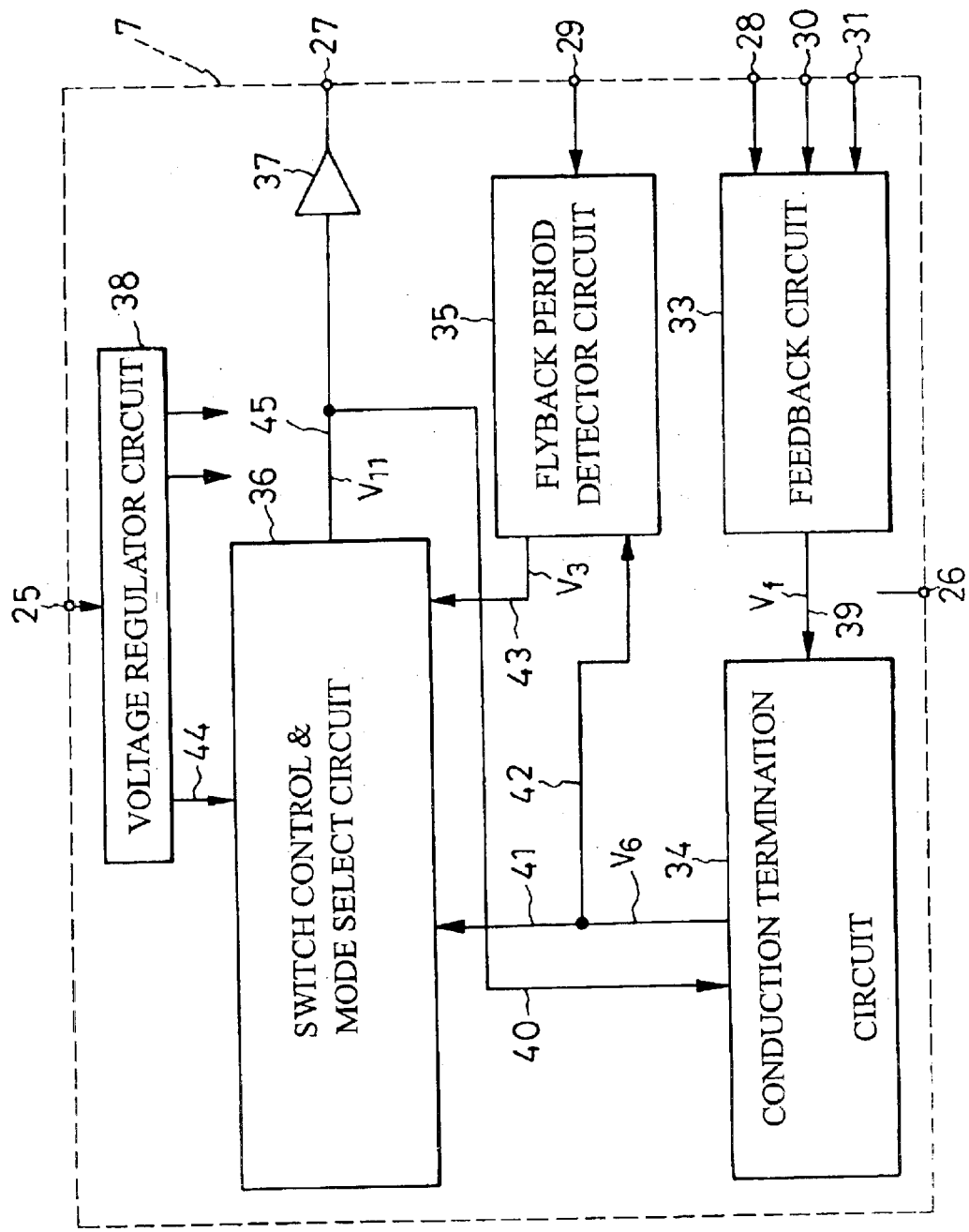
FIG. 2 is a block diagram of the switch control circuit included in the dc-to-dc converter of FIG. 1.

FIG. 2 is a more detailed, though still block-diagrammatic, illustration of the switch control circuit 7 designed for most efficacious performance of all the eight functions enumerated above. The components of the switch control circuit 7, shown in the form of blocks in FIG. 2, are all to be depicted as more detailed electrical diagrams in the subsequent figures.

Included in the switch control circuit 7 is, first of all, a feedback circuit 33 which has inputs connected to the current detect terminal 28 and the pair of output voltage detect terminals 30 and 31. The feedback circuit 33 creates a feedback signal $V_f$ in the form of the resultant of the incoming current detect signal and output voltage detect signal.

The feedback signal $V_f$ is sent over a path 39 to a conduction termination circuit 34. This circuit 34 has another input connected to a switch control and mode select circuit 36 by way of a signal path 40, and an output connected both to the switch control and mode select circuit 36 by way of a signal path 41 and to a flyback period detector circuit 35 by way of a signal path 42. Responding both to the feedback signal $V_f$ from the feedback circuit 33 and to a switch control signal $V_{11}$ applied from the switch control and mode select circuit 36 to the switch 3, FIG. 1, the conduction termination circuit 34 puts out a conduction termination signal $V_6$ indicative of the end of each conducting period, and hence the beginning of the next nonconducting period, of the switch. The conduction termination signal $V_6$ is delivered both to the switch control and mode select circuit 36 over the path 41 and to the flyback period detector circuit 35 over the path 42.

The flyback period detector circuit 35 has an input connected to the flyback voltage detect terminal 29, another input connected as-aforesaid to the conduction termination circuit 34 by way of the signal path 42, and an output connected to the switch control and mode select circuit 36 by way of a signal path 43. This circuit 35 creates a flyback period detect signal $V_3$ indicative of the duration of the flyback voltage developing across the tertiary winding 17, FIG. 1, of the transformer 2. The flyback period detect signal $V_3$ is sent over the path 43 to the switch control and mode select circuit 36.

The switch control and mode select circuit 36 is connected to the conduction termination circuit 34 by way of the signal path 41, to the fly-back period detector circuit 35 by way of the signal path 43, and to a voltage regulator circuit 38 by way of a power path 44. In response to the inputs from these circuits the switch control and mode select circuit 36 forms a switch control signal for on-off control of the switch 3 in either of two different modes. The switch control signal is sent over the path 45 to a switch driver circuit 37 and thence to the control gate of the switch 3.

The voltage regulator circuit 38 is connected to the supply terminal 25 and thence to the control power supply circuit 8. The resulting output voltage from the voltage regulator circuit 38 is fed over the path 44 to the switch control and mode select circuit 36, as well as to the feedback circuit 33, conduction termination circuit 34, flyback period detector circuit 35, and switch driver circuit 37 over unshown paths. All these circuits 33–37 may be connected directly to the supply terminal 25 in cases where no voltage regulation is needed.

Feedback Circuit

Figure 3:
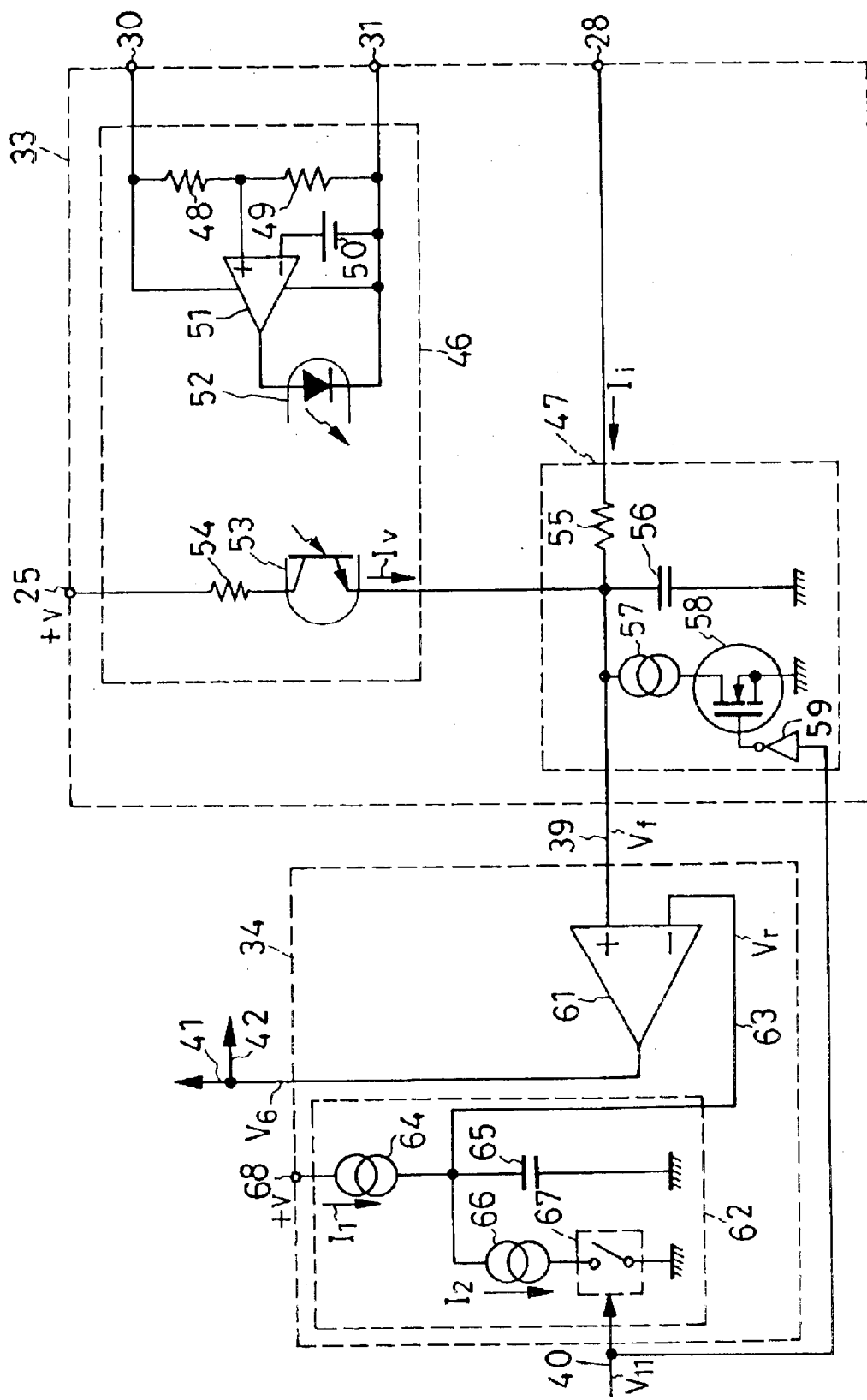
FIG. 3 is a schematic electrical diagram showing in more detail the feedback circuit and conduction termination circuit which are both included in the switch control circuit of FIG. 2.
Figure 4:
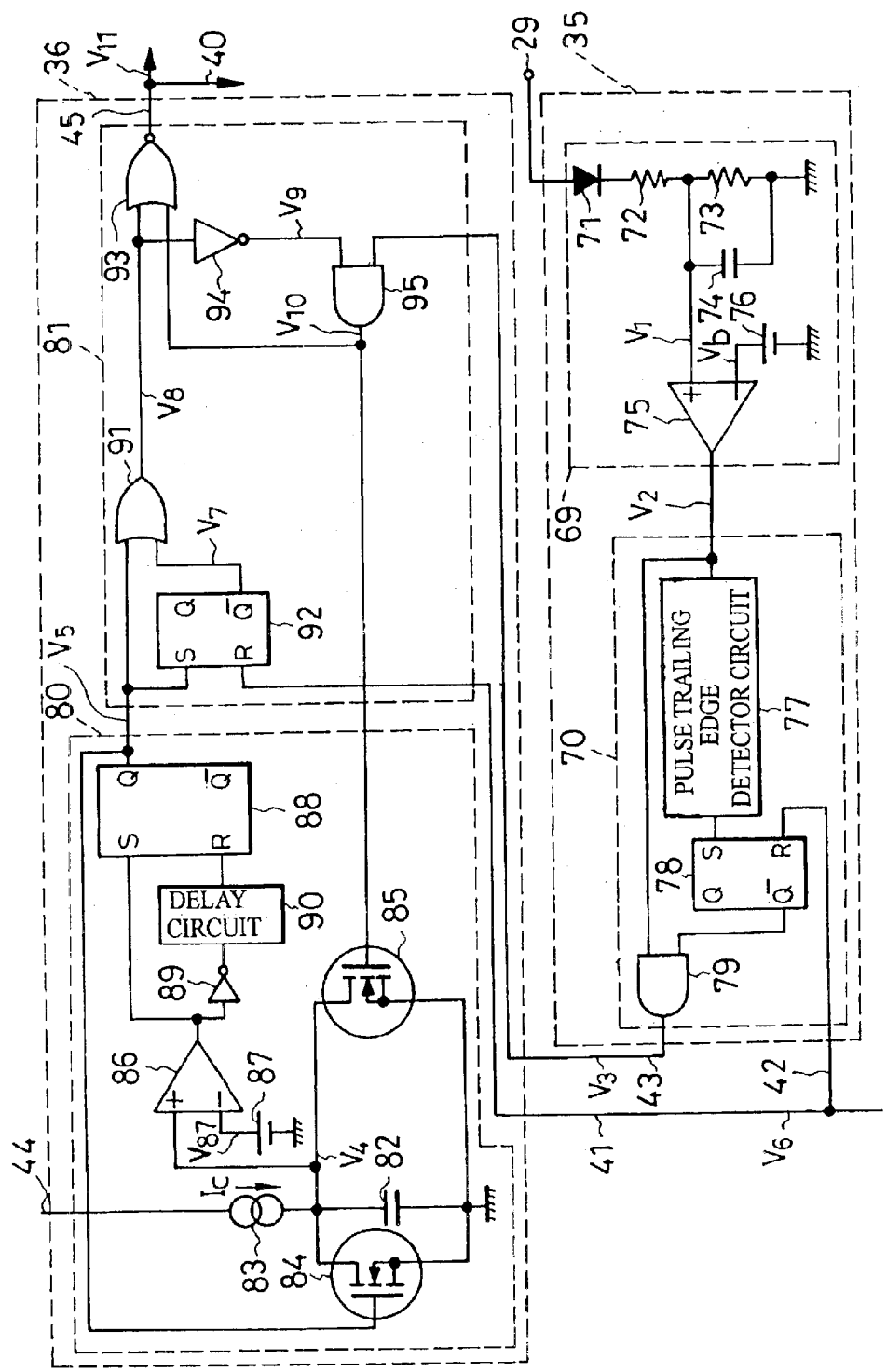
FIG. 4 is a schematic electrical diagram showing in more detail the flyback period detector circuit and switch control and mode select circuit which are both included in the switch control circuit of FIG. 2.

Of the above noted components of the switch control circuit 7, the feedback circuit 33 and conduction termination circuit 34 are shown in detail in FIG. 3, and the flyback period detector circuit 35 and switch control and mode select circuit 36 in FIG. 4. With reference now to FIG. 3 the feedback circuit 33 comprises:

1. An output voltage feedback circuit 46 for providing a voltage signal $I_v$ indicative of the converter output voltage.
2. A sawtooth feedback circuit 47 for providing the feedback signal $V_f$ of sawtooth waveform to be fed back to the conduction termination circuit 34, by combining the voltage signal $I_v$ from the circuit 46 and the current signal $I_i$ from the current detect terminal 28. Therefore, the sawtooth feedback circuit 47 is the signal composite circuit.

The output voltage feedback circuit 46 has two voltage-dividing resistors 48 and 29 connected in series with each other between the pair of input terminals 30 and 31. A differential amplifier 51 has its positive input connected to the junction between the resistors 48 and 49, its negative input to a reference voltage source 50, and its output to one terminal of a light emitting diode 52, the other terminal of which is connected to the grounded input terminal 31. Thus the differential amplifier 51 puts out a voltage representative of the difference between a fraction of the converter output voltage and the reference voltage from the source 50. The LED 52 translates this voltage output from the differential amplifier 51 into an optical output of matching intensity.

Also included in the output voltage feedback circuit 46 is a phototransistor 53 which is optically coupled to the LED 52 and which is electrically connected via a resistor 54 to the supply terminal 25 thereby to be fed with a dc voltage. The phototransistor 53 offers resistance in inverse proportion to the intensity of the optical output from the LED 52. As a consequence, there flow through the phototransistor 53 the current $I_v$ of magnitude proportional to the converter output voltage $V_0$. This current $I_v$ constitutes the output voltage signal or the voltage feedback signal to be directed into the sawtooth feedback circuit 47.

The sawtooth feedback circuit 47 has a resistor 55 connected between the current detect terminal 28 and the output 39 of this circuit 47 and of the entire feedback circuit 33. A capacitor 56 is connected between the output 39 and the ground, that is, in parallel with the current detect resistor 4, FIG. 1, via the resistor 55. The input current $I_i$ of this sawtooth feedback circuit 47 is in proportion with the current flowing through the current detect resistor 4. Therefore, the current signal $I_i$ is the current feedback signal. The capacitor 56 is charged to a voltage $V_f$ by both the current signal $I_i$ from the current detect terminal 28 and the output voltage signal $I_v$ from the output voltage feedback circuit 46. The voltage $V_f$ across the capacitor 56, which is fed back to the conduction termination circuit 34, is therefore the resultant of the current signal $I_v$; and output voltage signal $I_v$; in other words, the feedback signal $V_f$ is the addition, in prescribed proportions, of the voltage across the current detect resistor 4 and the converter output voltage $V_o$ between the pair of converter output terminals 20 and 21, FIG. 1.

Further components of the sawtooth feedback circuit 47 are a current regulator 57 and field effect transistor 58, which are connected in series with each other and in parallel with the capacitor 56. The FET 58 has its gate connected via an inverter 59 to the switch control signal path 40 which has been set forth in conjunction with FIG. 2. The FET 58 conducts, therefore, when the switch control signal $V_{11}$, on the path 40 goes low, providing a current bypass around the capacitor 56.

Figure 5:
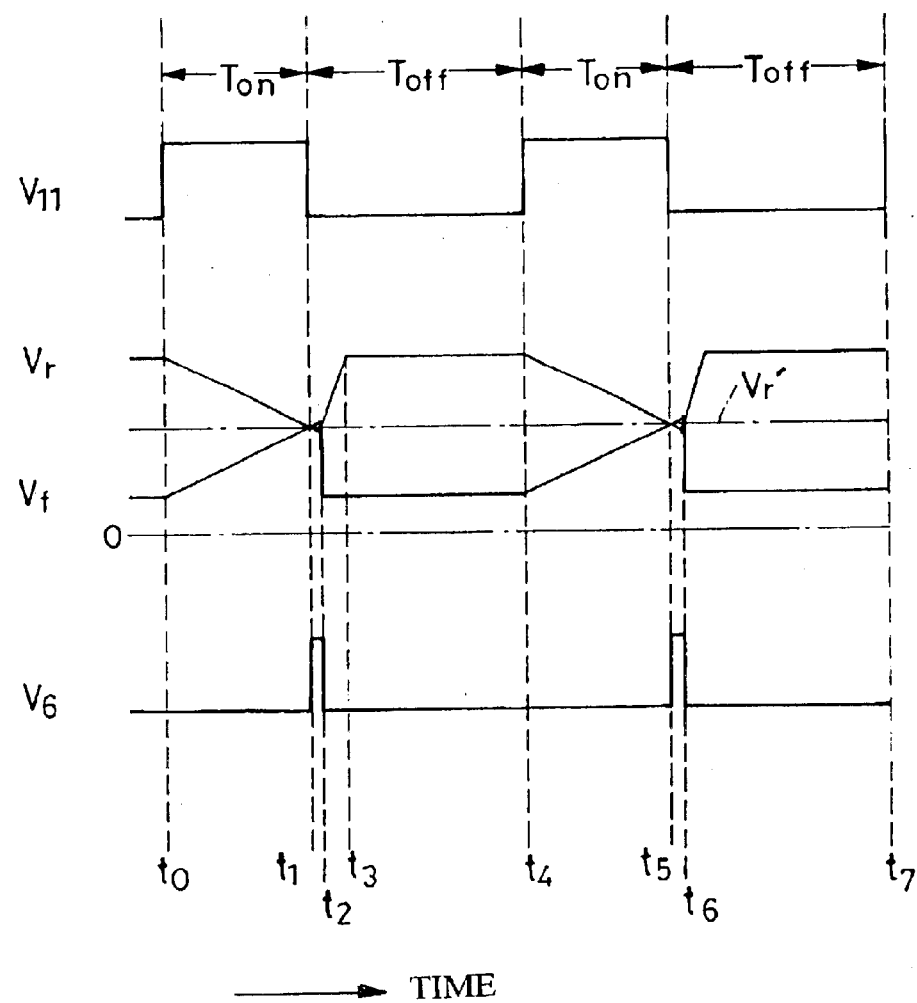
FIG. 5 is a diagram of waveforms useful in explaining the operation of the circuits of FIG. 3.

FIG. 5 indicates at $V_f$ the waveform of the feedback signal delivered as above from feedback circuit 33 to conduction termination circuit 34 during two consecutive cycles, from $t_0$ to $t_7$, of the on-off operation of the switch 3. The feedback signal rises with a gradient during each conducting period $T_{on}$, of the switch 3, rapidly drops soon after the beginning of the nonconducting period $T_{off}$, and remains low until the switch conducts again. Since the transformer primary 15 is inductive, the current flowing therethrough during the conducting periods $T_{on}$ of the switch 3 increases with time. Further, as the capacitor 56 of the sawtooth feedback circuit 47 is charged gradually, the feedback signal $V_f$ takes on the sawtoothed waveform as in FIG. 5. Hence the naming of "sawtooth feedback circuit". The sawtooth feedback signal $V_f$ changes in amplitude with the output voltage $V_0$.

Conduction Termination Circuit

As also shown in detail in FIG. 3, the conduction termination circuit 34 is broadly divisible into a comparator 61 and a reference signal generator circuit 62. The comparator 61 has its positive input connected to the output path 39 of the feedback circuit 33, and its negative input to the out-put path 63 of the reference signal generator circuit 62. This circuit 62 provides the reference signal $V_r$ shown in FIG. 5. Comparing the two inputs $V_f$ and $V_r$, the comparator 61 puts out the conduction termination signal $V_6$, FIG. 5, that is high, as from $t_1$ to $t_2$ and from $t_5$ to $t_6$, when the feedback signal $V_f$ is higher in value than the reference signal $V_r$. As has been mentioned with reference to FIG. 2, this conduction termination signal $V_6$ is sent from the conduction termination circuit 34 to the switch control and mode select circuit 36 over the path 41 and to the flyback period detector circuit 35 over the path 42.

The reference signal generator circuit 62 has a constant-current regulator 64 for providing current $I_1$. The constant-current regulator 64 is connected to a dc supply terminal 68 on one hand and, on the other, grounded via a capacitor 65. The supply terminal 68 is connected to the voltage regulator circuit 38, FIG. 2. Another constant-current regulator 66. which provides current $I_2$, is connected in parallel with the capacitor 65 via a semiconductor switch 67. This semiconductor switch 67 has its control terminal connected to the output path 40 of the switch control and mode select circuit 36, FIG. 2, in order to be driven by the switch control signal $V_{11}$.

Thus the switch 67 turns on and off in synchronism with the switch 3, FIG. 1. The capacitor 65 is charged by the current $I_1$, from the first constant-current regulator 64 during the nonconducting periods $T_{off}$ of the switch 3, when the switch control signal $V_{11}$ is low, holding the switch 67 open too. As will be better understood by referring to FIG. 5 again, the voltage across the capacitor 65 (i.e. reference signal $V_r$) rises gradually as from $t_2$ to $t_3$ in each such nonconducting period $T_{off}$ and remains constantly high until $t_4$ when the switch 3 is closed. To be more exact, however, the reference signal $V_r$ starts rising during the short period, as from $t_1$ to $t_2$, that immediately follows the beginning of each nonconducting period. The switch 67 is closed during the conducting periods $T_{on}$ of the switch 3, when the switch control signal $V_{11}$ is high. The capacitor 65 is then permitted to discharge, so that the reference signal $V_r$ gradually diminishes as from $t_0$ to $t_1$ in FIG. 1. It is thus seen that the reference signal $V_r$ has a trapezoidal waveform as in FIG. 5.

Comparing the trapezoidal reference signal $V_r$ and sawtooth feedback signal $V_f$, the comparator 61 puts out the desired conduction termination signal $V_6$, shown also in FIG. 5, which is high during the brief periods of time, as from $t_1$ to $t_2$ and from $t_5$ to $t_6$, when the feedback signal is higher than the reference signal. The rises, as at $t_1$ and $t_5$, of the short duration pulses contained in the conduction termination signal $V_6$ represent the ends of the conducting periods $T_{on}$, and beginnings of the nonconducting periods $T_{off}$, of the switch 3. The beginnings, as at $t_0$ and $t_4$, of the conducting periods $T_{on}$ of the switch 3 are predetermined at fixed intervals of time, as will be discussed in more detail presently. Consequently, as the leading edges of the conduction termination pulses $V_6$ are determined as above, so are the durations of the conducting periods $T_{on}$.

It is to be understood that the trapezoidal waveform of the reference signal $V_r$ drawn in FIG. 5 is not an absolute necessity; instead, for example, the reference signal could be a unidirectional voltage, as indicated by the dot-and-dash line in FIG. 5 and labeled $V_r'$.

Flyback Period Detector Circuit

Reference is now invited to FIG. 4 for a study of the flyback period detector circuit 35, a further component of the switch control circuit 7 shown in FIG. 2. The flyback period detector 35 is therein shown subdivided into a tertiary voltage detector circuit 69 and a flyback period pulse extractor circuit 70.

The tertiary voltage detector circuit 69 has two voltage-dividing resistors 72 and 73 connected in series with each other and, as will be noted by referring back to FIG. 1, in parallel with the transformer tertiary 17 via a diode 71. The resistor 73 is connected in parallel with a capacitor 74. A wave-shaping comparator 75 has its positive input connected to the capacitor 74 and to the junction between the resistors 72 and 73 for inputting a fraction of the tertiary voltage as the tertiary voltage detect signal $V_1$. The negative input of the comparator 75 is connected to a source 76 of reference voltage $V_b$. Less in capacitance than the smoothing capacitors 19 and 24, the capacitor 74 is designed to impart a slight delay to the tertiary voltage detect signal $V_1$ which actually represents the voltage across the resistor 73.

Figure 6:
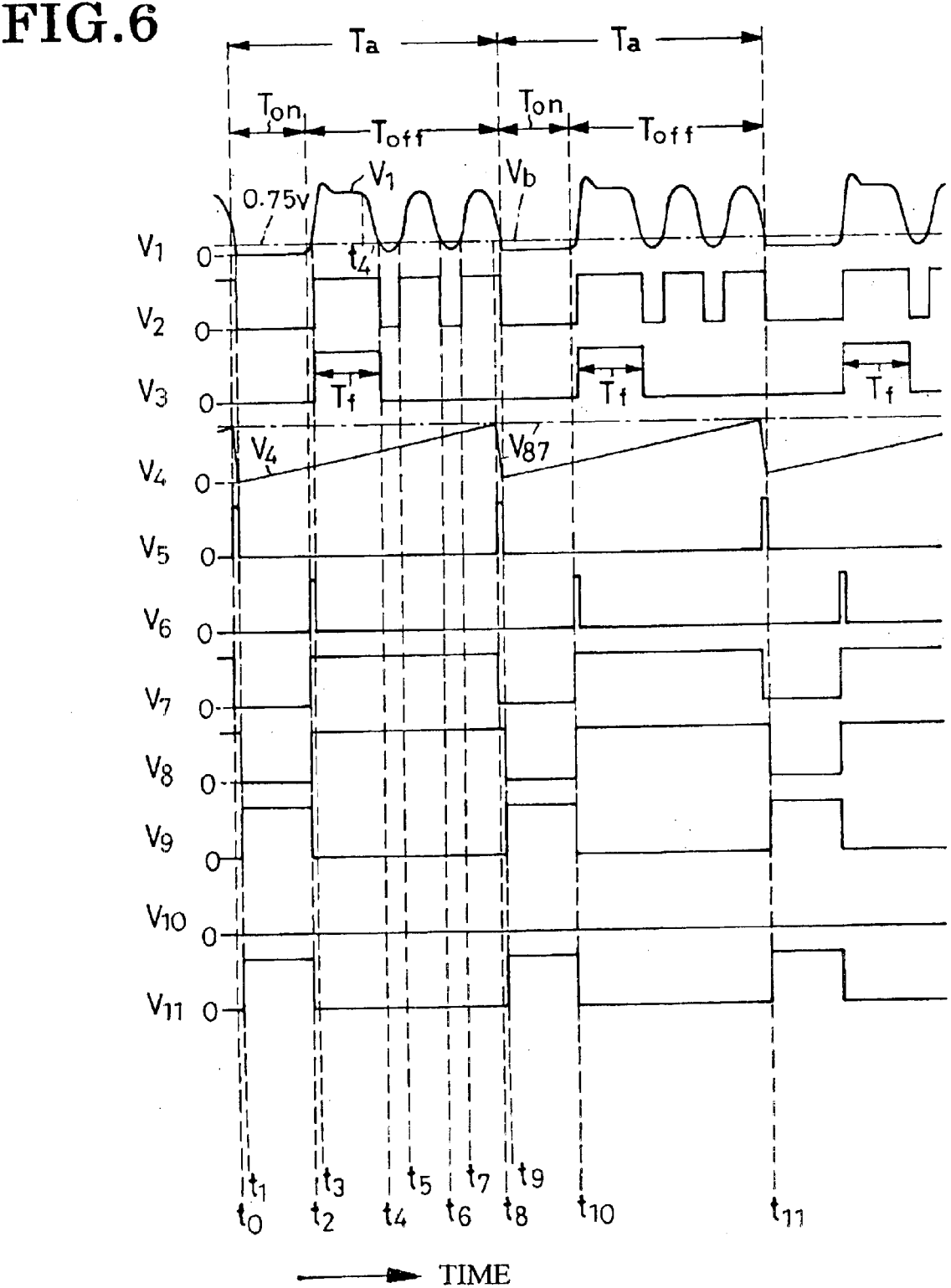
FIG. 6 is a diagram of waveforms useful in explaining the operation of the circuits of FIG. 4 in light load mode.
Figure 7:
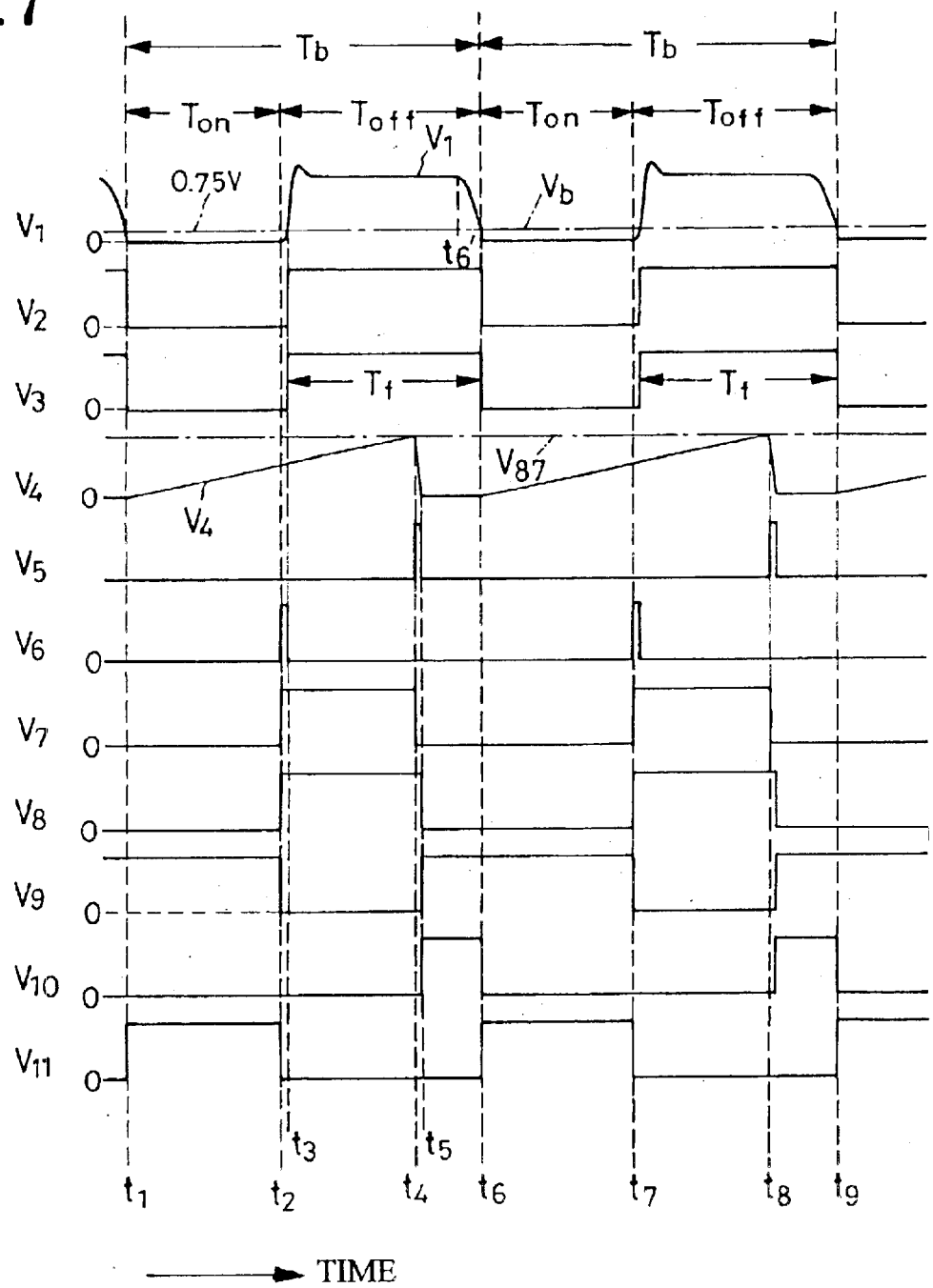
FIG. 7 is a diagram of waveforms useful in explaining the operation of the circuits of FIG. 4 in heavy load mode.

The tertiary voltage detect signal $V_1$ has the waveform portrayed in FIG. 6 when the FIG. 1 converter is operating under light load, and in FIG. 7 when it is operating under heavy load. The diode 71 is so oriented as to conduct in response to the voltage induced across the transformer tertiary 17 during the nonconducting periods $T_{off}$ of the switch 3. A voltage in proportion with that developing across the transformer primary 15 during the nonconducting periods $T_{off}$ of the switch 3 is therefore obtained across the serial connection of the resistors 72 and 73 on the output side of the diode 71. The transformer primary 15 can be thought of as being connected in parallel with the switch 3 via the input rectifying and smoothing circuit 1 in terms of alternating current, so that the voltage across the transformer primary 15 is equal to that across the switch 3. Thus, as indicated in both FIGS. 6 and 7, the voltage $V_1$ proportional to the voltage $V_{DS}$ across the switch 3 is obtained across the resistor 73 of the tertiary voltage detector circuit 69.

The voltage $V_{DS}$ across the switch 3 is approximately zero when it is conducting, and when it is opened, rises gradually owing to the resonance of the capacitance of the capacitor 5 and the inductance of the transformer primary 15. Upon completion of energy release from the transformer 2 during the nonconducting periods of the switch 3, both the voltage across the transformer primary 15 and the voltage across the switch 3 changes by ringing. Essentially, despite its name, the tertiary voltage detector circuit 69 detects the voltage $V_{DS}$ across the switch 3, so that this circuit 69 in combination with the transformer tertiary 17 constitutes the means for detection of the switch voltage.

The tertiary or switch voltage detect signal $V_1$ is applied as aforesaid to the positive input of the comparator 75, the other input of which receives the reference voltage $V_b$ from its source 76. The reference voltage $V_b$ may be 0.75 volt or so, a value less than the maximum of the tertiary voltage detect signal $V_1$. Broadly, the reference voltage $V_b$ may be zero or some-what what more than the bottom value of the ringing components of the tertiary voltage detect signal $V_1$.

Comparing the two inputs $V_1$ and $V_b$, the comparator 75 provides a binary output $V_2$ shown also in FIGS. 6 and 7. The comparator output $V_2$ is high when the tertiary voltage detect signal is higher than the reference level $V_b$. Therefore, when the converter is under light load as in FIG. 6, the comparator output $V_2$ is high as from $t_3$ to $t_4$, from $t_5$ to $t_6$, and from $t_7$ to $t_9$, and when the converter is heavily loaded as in FIG. 7, from $t_3$ to $t_6$. A comparison of the input and output waveforms will reveal that the comparator 75 functions as wave-shaping circuit for the tertiary voltage detect signal $V_1$.

The flyback voltage is a voltage due to the release of the stored energy by the transformer 2 during each nonconducting period of the switch 3. Therefore, in the strict sense of the term, the flyback voltage may be considered to exist from, for instance, $t_2$ in FIG. 6, when one nonconducting period $T_{off}$ of the switch 3 begins. to $t_4'$ in FIG. 6, when the energy release is completed, or from $t_2$ to $t_6'$ in FIG. 7. The duration of the flyback voltage in its exact sense may be redefined as the period of time the current is flowing through the diode 18, FIG. 1, of the output rectifying and smoothing circuit 7 during each nonconducting period of the switch 3 due to energy release from the transformer 2.

In this application, however, the duration of the flyback voltage (referred to as the flyback period for short, as in "flyback period detector circuit 35") is somewhat more loosely taken as the period from the beginning of each nonconducting period of the switch 3 to the moment the comparator 75 of the tertiary voltage detector circuit 69 goes low. Thus the flyback period $T_f$ is shown as lasting from $t_2$ to $t_4$ in FIG. 6, and from $t_2$ to $t_6$ in FIG. 7.

The flyback period pulse extractor circuit 70, the other constituent of the flyback period detector circuit 35 shown in detail in FIG. 4, has a pulse trailing edge detector circuit 77 connected directly to the comparator 75 of the tertiary voltage detector circuit 69. As the name implies, the pulse trailing edge detector circuit 77 detects the trailing edges of the comparator output pulses $V_2$ shown in both FIGS. 6 and 7 and put out short duration pulses in synchronism therewith. In the case of FIG. 6, for example, the pulse trailing edge detector circuit 77 will produce pulses as at $t_4$, $t_6$ and $t_9$.

The pulse trailing edge detector circuit 77 has its output connected to the set terminal S of an RS flip flop 78, which has its reset input R connected to the conduction termination circuit 43, FIGS. 2 and 3, by way of the conduction termination signal path 42. The flip flop 78 has its inverting output $\overline{Q}$ connected to one of the two inputs of an AND gate 79, the other input of which is connected directly to the comparator 75 of the tertiary voltage detector circuit 69. The flip flop 78 is therefore reset by each conduction termination pulse $V_6$ shown in both FIGS. 6 and 7 and set by each output pulse of the pulse trailing edge detector circuit 77.

More specifically, in the case of FIG. 6, the flip flop 78 is reset as at $t_2$ and set as at $t_4$. The inverting output $\overline{Q}$ of the flip flop 78 is therefore high as from $t_2$ to $t_4$ in FIG. 6. The output $V_2$ from the comparator 75, on the other hand, is high as from $t_3$ to $t_4$ in FIG. 6. Consequently, the output from the AND gate 79, or the flyback period detect signal $V_3$, is high as from $t_3$ to $t_4$ in FIG. 6. Although the comparator output $V_2$ is high as from $t_5$ to $t_6$ and from $t_7$ to $t_9$, too, in FIG. 6, the flip flop 78 is then set, holding the AND gate 79 low. It is therefore only the first of each rapid succession of comparator output pulses $V_2$ that is allowed to pass the AND gate 79 to constitute the flyback period detect signal $V_3$ when the converter is under light load as in FIG. 6.

Under heavy load as represented by FIG. 7, on the other hand, the ringing voltage does not repeat itself, so that the flip flop 78 is reset as at $t_2$ and set as at $t_6$. The flyback period detect signal $V_3$ is then constituted of the comparator output pulses $V_2$.

Switch Control and Mode Select Circuit

With continued reference to FIG. 4 the switch control and mode select circuit 4 is therein shown as a combination of a pulse generator circuit 80 and a control pulse forming circuit 81. The functions of the switch control and mode select circuit 4 may be summarized into the following three:

1. To create the switch control signal $V_{11}$ having the waveform shown in FIG. 6 when the converter is under light load or first mode.
2. To create the switch control signal $V_{11}$ having the waveform shown in FIG. 7 when the converter is under heavy load or second mode.
3. To automatically switch the switch control signal $V_{11}$ between the waveforms of FIGS. 6 and 7.

The pulse generator circuit 80 generates a series of clock pulses shown at $V_5$ in both FIGS. 6 and 7. The recurrence rate of the clock pulses $V_5$ is constant somewhere in the range of 20 to 100 kilohertz under light load but, in heavy load, subject to change with the output voltage of the input rectifying and smoothing circuit 1 or with the power requirement of the load 22.

Referring more specifically to FIG. 4, the pulse generator circuit 80 includes a capacitor 82 for creating a sawtooth voltage $V_4$. The capacitor 82 is connected to a unidirectional voltage supply line 44 via a constant-current regulator 83 on one hand and, on the other, grounded. A first 84 and a second 85 FET switch are each connected in parallel with the capacitor 82 for causing its discharge. The first discharge switch 84 has its control terminal connected to the noninverting output Q of an RS flip flop 88 for inputting the clock pulses $V_5$. The second discharge switch 85 has its control terminal connected to an AND gate 95, which is included in the control pulse forming circuit 81, for inputting its output $V_{10}$. Thus, as will be better understood from an inspection of FIGS. 6 and 7, the capacitor 82 is charged from the constant-current regulator 83 when both control inputs $V_5$ and $V_{10}$ to the switches 84 and 85 are low, and discharges when either of the switch control inputs $V_5$ and $V_{10}$ is high. As the voltage across the capacitor 82 rises with a gradient when both switches 84 and 85 are open, the sawtooth voltage is obtained as at $V_4$ in FIGS. 6 and 7.

Also included in the pulse generator circuit 80 is a comparator 86 which has its positive input connected to the capacitor 82 for inputting the sawtooth voltage $V_4$, and its negative input connected to a source 87 of reference voltage $V_{87}$. The comparator 86 goes high when the sawtooth voltage $V_4$ rises to the reference voltage $V_{87}$.

A further component of the pulse generator circuit 80 is a flip flop 88 which has a set input S connected directly to the comparator 86, and a reset input R connected to the same comparator via an inverter 89 and delay circuit 90. Functioning just like the monostable multivibrator, the combination of the flip flop 88, inverter 89 and delay circuit 90 provides pulses, from the noninverting output Q of the flip flop, that rise when the comparator 86 goes high and that have a duration equal to the delay introduced by the delay circuit 90. These output pulses from the flip flop 88 constitute the desired clock pulses to be issued from the complete pulse generator circuit 80, the clock pulses being designated $V_5$ and shown as such in both FIGS. 6 and 7. The repetition rate of the clock pulses $V_5$ is the same as that of the on-off operation of the switch 3. The second discharge switch 85 could be included in the control pulse forming circuit 81, rather than in the pulse generator circuit 80.

The control pulse forming circuit 81 puts out as aforesaid the two different kinds of switch control pulses $V_{11}$, as in FIGS. 6 and 7, depending upon whether the FIG. 1 converter is under light or heavy load. Changes between the two kinds of switch control pulses $V_{11}$ are made automatically. The control pulse forming circuit 81 relies for these functions upon the clock pulses $V_5$ from the pulse generator circuit 80, FIG. 4, the output signal $V_3$ of the flyback period detector circuit 35, FIG. 4, and the output signal $V_6$ of the conduction termination circuit 34, FIG. 3.

With reference to FIG. 4 again the control pulse forming circuit 81 has an OR gate 91 having one input connected to the noninverting output of the flip flop 88 of the pulse generator circuit 80, and another input connected to the inverting output of a flip flop 92 included in the control pulse forming circuit 81. The flip flop 92 has a set input connected to the noninverting output of the flip flop 88, and a reset input connected to the conduction termination circuit 34 by way of the signal path 41. The flip flop 92 is reset from the leading edge of each conduction termination pulse $V_6$ fed over the path 41 to the leading edge of the subsequent clock pulse $V_5$ from the pulse generator circuit 80. Thus, in light load mode represented by FIG. 6, the output $V_7$ from the flip flop 92 is high as from $t_2$ to $t_8$ in that figure. In heavy load mode, on the other hand, the output $V_7$ from the flip flop 92 is high as from $t_2$ to $t_4$ in FIG. 7. This signal $V_7$ could of course be obtained by inverting the noninverting output Q of the flip flop 92.

The OR gate 91 is high when either or both of its two inputs $V_5$ and $V_6$ are high. The output $V_8$ from the OR gate 91 is therefore high as from $t_2$ to $t_9$ in FIG. 6 in light load mode, and as from $t_2$ to $t_5$ in FIG. 7 in heavy load mode.

Also included in the control pulse forming circuit 81 is a NOR gate 93 which has one input connected to the OR gate 91, and another input to the AND gate 95. This AND gate in turn has one input connected to the OR gate 91 via an inverter 94, and another input to the flyback period detector circuit 35 by way of the signal path 43 for inputting the flyback period detect signal $V_3$. As has been mentioned in connection with the pulse generator circuit 80, the output of the AND gate 95 is connected to the control terminal of the second discharge switch 85, besides being connected to the NOR gate 93 as above.

As indicated in both FIGS. 6 and 7, the output $V_9$ from the inverter 94 is a phase inversion of the output $V_8$ from the OR gate 91. The inverter output $V_9$ is therefore high from $t_1$ to $t_2$, and low fro $t_2$ to $t_9$, in light load mode as in FIG. 6, and low from $t_2$ to $t_5$, and high from $t_5$ to $t_7$ in heavy load mode as in FIG. 7. The flyback period detect signal $V_3$ is high from $t_3$ to $t_4$ in the light load mode of FIG. 6, but the inverter output $V_9$ is low during this period, so that the output $V_{10}$ from the AND gate 95 is also low. In the heavy load mode of FIG. 7, however, both flyback period detect signal $V_3$ and inverter output $V_9$ are high from $t_5$ to $t_6$, so that the AND gate output $V_{10}$ is also high during this period.

The output $V_{10}$ from the AND gate 95 is fed both to the NOR gate 93 for creation of the switch control pulses $V_{11}$ and to the second discharge switch 85 of the pulse generator circuit 80 for change between the light and the heavy load mode. Mode change by the AND gate output $V_{10}$ takes place as follows:

The AND gate output $V_{10}$ is low in light load mode, holding the second discharge switch 85 open. The cycle of the sawtooth voltage $V_4$ created by the capacitor 82 is therefore constant in this mode, and so is the cycle $T_a$, FIG. 6, of the output $V_5$ from the flip flop 88. By contrast, in heavy load mode, the AND gate output $V_{10}$ is high as from $t_5$ to $t_6$ in FIG. 7, when both inputs $V_3$ and $V_9$ to the AND gate 95 are high. The high AND gate output $V_{10}$ causes conduction through the second discharge switch 85, preventing the capacitor 82 from being charged. The sawtooth voltage $V_4$ remains zero as from $t_5$ to $t_6$ in FIG. 7. Following the resumption of the charging of the capacitor 82 at $t_6$, the capacitor voltage will develop and reach the reference voltage $V_{87}$ as at $t_8$ in FIG. 7 thereby causing the Q output $V_5$ from the flip flop 8 to go high at that moment. It will be observed from a study of FIGS. 6 and 7 that the output pulses $V_5$ of the pulse generator circuit 80 are longer in period in the heavy load mode of FIG. 7 than in the light load mode of FIG. 6. The periods of the pulses $V_5$ are further subject to change with the power requirement of the load 22.

The output $V_{10}$ from the AND gate 95 is also directed as aforesaid into the NOR gate 93. As a result, in heavy load mode, the output $V_{11}$ from the NOR gate 93 is made low as from $t_5$ to $t_6$ in FIG. 7, when the AND gate output $V_{10}$ is high. The AND gate output $V_{10}$ is constantly low in light load mode, so that the NOR gate output $V_{11}$ is totally unaffected by the AND gate output, being, as seen in FIG. 6, a simple phase inversion of the output $V_8$ from the OR gate 91. The NOR gate output pulses $V_{11}$ are constant and the same in period as the sawtooth voltage $V_4$ and the clock pulse output $V_5$ from the pulse generator circuit 80. It will also be noted from FIG. 6 that the NOR gate output pulses $V_{11}$ determine the conducting periods $T_{on}$, as from $t_1$ to $t_2$ and from $t_9$ to $t_{10}$. The switch 3 is thus turned on and off with the constant cycle $T_a$ in light load mode or first mode.

In the heavy load mode of FIG. 7, on the other hand, the pulses existing in the output $V_{10}$ from the AND gate 95 keep the NOR gate output $V_{11}$ low, as from $t_5$ to $t_6$. Consequently, even though the output $V_8$ from the OR gate 91 goes low as at $t_5$, the NOR gate output $V_{11}$ does not go high immediately but stays low until $t_6$ when the AND gate output $V_{10}$ goes low. Since the switch 3 opens and closes as dictated by the NOR gate output $V_{11}$, both conducting period $T_{on}$ and nonconducting period $T_{off}$ of the switch are subject to change with the power requirement of the load 22 in heavy load mode. The on-off operation of the switch 3 is independent of the output frequency of the pulse generator circuit 80 in heavy load mode or second mode.

As is clear from the foregoing, the NOR gate 93 functions to finally create the switch control pulses $V_{11}$ for driving the switch 3. The AND gate 95 functions to determine whether the flyback period $T_f$ as represented by each flyback period detect pulse $V_3$ terminates before or after one associated output pulse $V_5$ of the pulse generator circuit 80, and to cause a change between light and heavy load mode accordingly.

The switch 3 is turned on in heavy load mode when the drain-source voltage $V_{DS}$ of the switch is zero or nearly so. Thus, as is apparent from FIG. 7, the flyback voltage detect signal $V_3$ goes low when the tertiary voltage detect signal $V_1$ drops either to zero or to the reference voltage $V_b$ which is set close to zero. The leading edges, as at $t_6$, of the switch control pulses $V_{11}$ agree in time with the trailing edges of the flyback period detect pulses $V_3$ in FIG. 7, so that the switch 3 turns on when its drain-source voltage $V_{DS}$ is zero or nearly so. The result is the reduction of switching loss when the switch is turned on. The tertiary voltage detect signal $V_1$ is proportional as aforesaid with the voltage $V_{DS}$ across the switch 3.

The output pulses $V_6$ of the conduction termination circuit 34 will rise earlier than $t_2$ in FIGS. 6 and 7 when the converter output voltage $V_0$ exceeds the target range in both light and heavy load modes. Then the conducting periods $T_{on}$ of the switch 3 will become shorter to return the converter output voltage $V_0$ to the target range. The reversal of this procedure will occur when the converter output voltage $V_0$ falls below the target range. A change from the light load mode of FIG. 6 to the heavy load mode of FIG. 7 will occur through the following procedure:

The converter output voltage $V_0$ will drop when the power requirement of the load 22 grows greater than that represented by the light load mode of FIG. 6. Then the conducting periods $T_{on}$ of the switch 3 will become longer, and so will the flyback periods $T_f$. The switch 3 will be driven in heavy load mode as in FIG. 7 when each flyback period $T_f$ becomes so long as to terminate after the disappearance of one associated output pulse $V_5$ from the pulse generator circuit 80.

The advantages gained by this particular embodiment of the invention may be summarize as follows:

1. The switch control and mode select circuit 36, FIGS. 2 and 4, determines the drive mode for the switch 3 by comparing the moments of termination of the flyback periods $T_f$ and the trailing edges of the output pulses $V_5$ of the pulse generator circuit 80. The pulse generator circuit output pulses $V_5$ provides the moments in time in reference to which the flyback periods $T_f$ are evaluated. Thus the pulse generator circuit 80 performs two important functions: (a) to generate clock pulses for use in driving the switch 3 at a constant rate; (b) to provide reference moments in time for use in determination of each flyback period $T_f$ is longer than a prescribed limit or not. The switch control circuit 7 can therefore be less in size and cost than if separate means were provided for the two functions.

2. Further reduction in size and cost is realized as the AND gate 95, FIG. 4, of the control pulse forming circuit 81 is used both for creation of the switch control pulses $V_{11}$ and for a change between the light and heavy load modes.

3. The flyback periods $T_f$ are taken to terminate when the tertiary voltage detect signal $V_1$ drops to zero or close to zero. Further, in the heavy load mode of FIG. 7, the switch 3 is turned on upon extinction of the flyback voltage. Switching loss is thus appreciably reduced using simple circuit means.

4. The switch 3 is driven at a constant rate in light load mode. Any increase in switchings per unit length of time is avoided in order to prevent a decrease in the efficiency of the converter in light load mode.

5. The switch 3 is driven at a variable rate as required by the load in heavy load mode. The variable rate driving of the switch is preferable by reason of the dispersion of the frequencies of the noise due to the on-off operation of the switch, with consequent reduction of interference by the noise.

Embodiment of FIGS. 8–12

Figure 8:
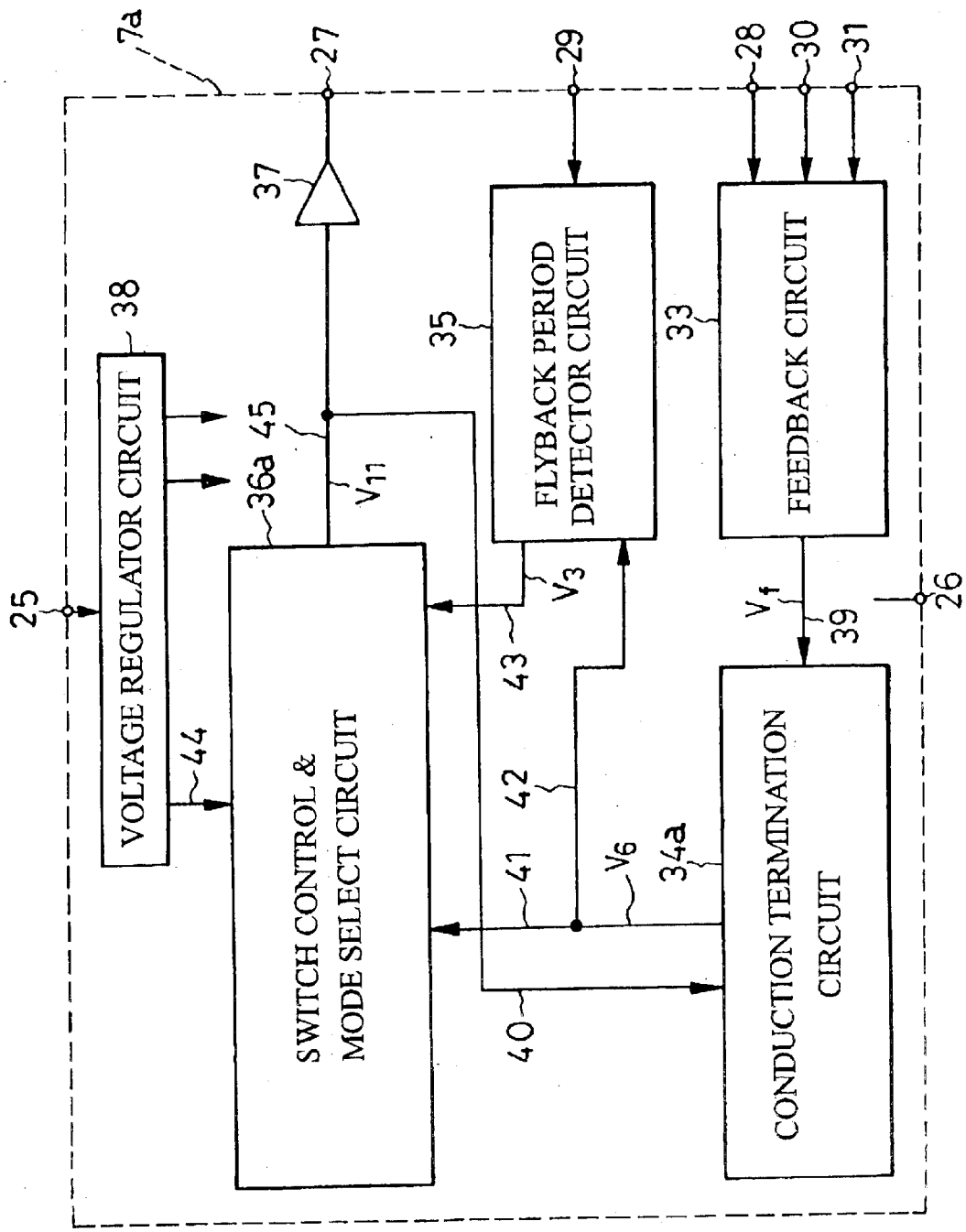
FIG. 8 is a schematic electrical diagram of another preferred form of switch control circuit for use in the dc-to-dc converter of FIG. 1 in substitution for the first disclosed switch control circuit of FIG. 2.

The second preferred form of dc-to-dc converter according to the invention includes the modified switch control circuit $7_a$ of FIG. 8, all the other details of construction being as set forth above in connection with the FIG. 1 embodiment. The modified switch control circuit $7_a$ is itself akin to its FIG. 2 counterpart except for changes in the conduction termination circuit 34, redesignated $34_a$ in FIG. 8 and shown in detail in FIG. 9, and in the switch control and mode select circuit 36, redesignated $36_a$ in FIG. 8 and shown in detail in FIG. 10. Operationally, the modified switch control circuit $7_a$ is best characterized by the fact that the switch 3 is driven as in the FIG. 1 embodiment in heavy load mode but, in light load mode, with a constant nonconducting period and a variable conducting period.

Figure 9:
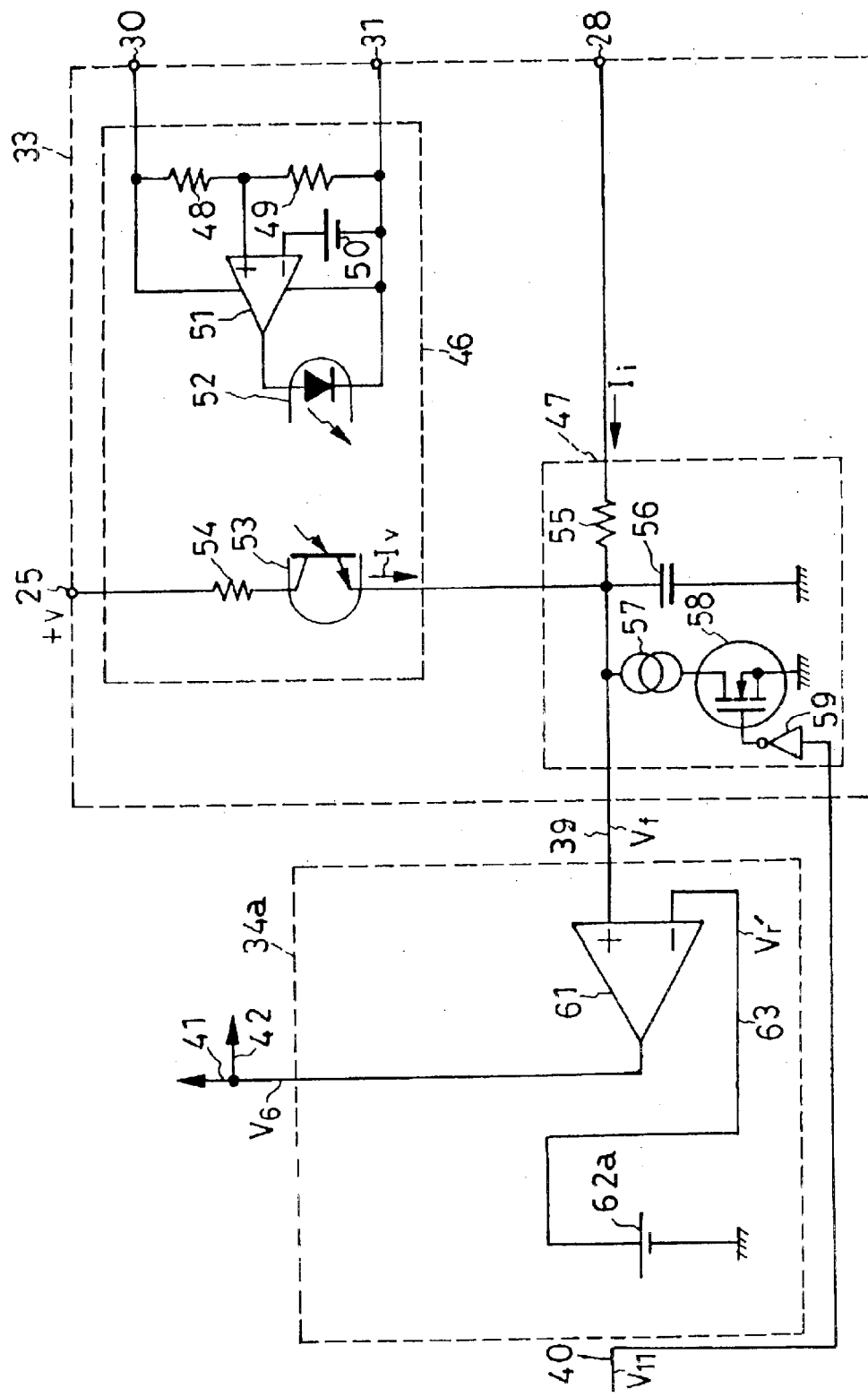
FIG. 9 is a schematic electrical diagram showing in more detail the feedback circuit and conduction termination circuit which are both included in the switch control circuit of FIG. 8.

With reference to FIG. 9, which shows the modified conduction termination circuit $34_a$ together with the unmodified feedback circuit 33, it will be seen that the modified conduction termination circuit is equivalent to its FIG. 3 counterpart 34 except that the modified circuit $34_a$ has a reference voltage source $62_a$ in substitution for the reference signal generator circuit 62 of the original circuit 34. The reference voltage source 62, is connected directly to the negative input of the comparator 61, to the positive input of which is connected the feedback circuit 33 as in the FIG. 1 embodiment.

The reference voltage $V_r'$ supplied by its source $62_a$ is predetermined in relation to the feedback signal $V_f$ from the feedback circuit 33, as indicated by the dot-and-dash line in FIG. 5. The comparator 61 puts out a pulse $V_6$ each time the feedback signal $V_f$ crosses the reference voltage $V_r'$. It is therefore apparent that the modified conduction termination circuit $34_a$ is similar in operation to its FIG. 3 counterpart 34.

Figure 10:
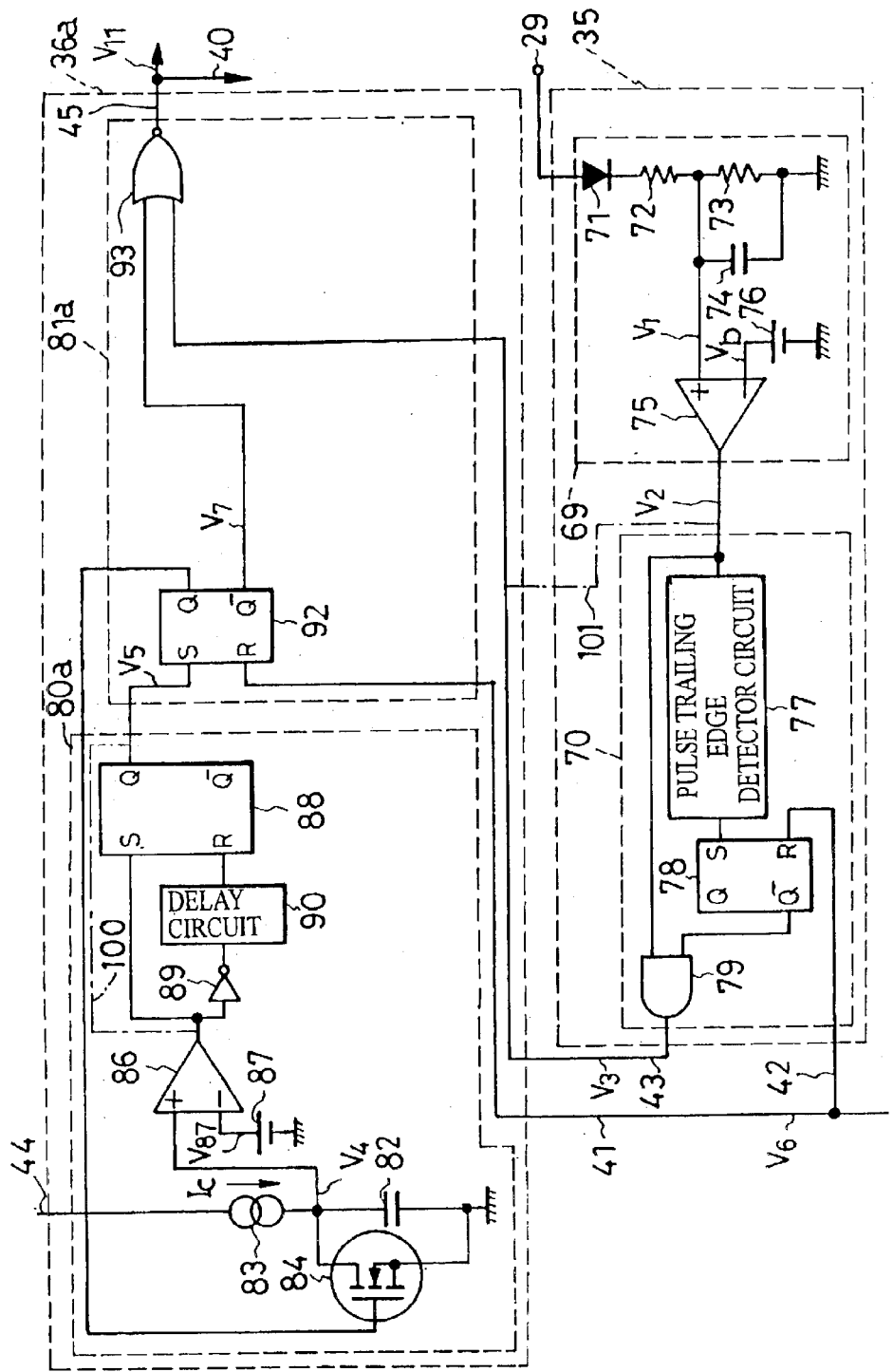
FIG. 10 is a schematic electrical diagram showing in more detail the flyback period detector circuit and switch control and mode select circuit which are both included in the switch control of FIG. 8.

In FIG. 10 is shown in detail the modified switch control and mode select circuit $36_a$ together with the unmodified flyback period detector circuit 35. The modified switch control and mode select circuit $36_a$ is comprised of a modified pulse generator $80_a$ and modified control pulse forming circuit $81_a$. The modified pulse generator $80_a$ is equivalent to the original pulse generator 80, FIG. 4, except that the former has no second discharge switch 85 connected in parallel with the capacitor 82 and that the remaining discharge switch 84 has its control terminal connected to the noninverting output Q of the RS flip flop 92 included in the modified control pulse forming circuit $81_a$.

The modified control pulse forming circuit $81_a$ is simpler in construction than the original control pulse forming circuit 81, comprising only the flip flop 92 and the NOR gate 93. The flip flop 92 has its set input S connected to the noninverting output Q of the flip flop 88 of the pulse generator $80_a$ for inputting its output pulses $V_5$, and its reset input R to the conduction termination circuit $34_a$, FIG. 9, by way of the signal path 41 for inputting the conduction termination signal $V_6$. The NOR gate 93 has one input connected to the inverting output Q of the flip flop 92, and another input to the flyback period detector circuit 35 by way of the path 43 for inputting the flyback period detect signal $V_3$. The output of the NOR gate 93 is connected to the control terminal of the switch 3, FIG. 1, via the switch driver circuit 37, FIG. 8, as well as to the feedback circuit 33, FIG. 9, by way of the signal path 40.

The showing of FIG. 10 admits of several further modifications within the scope of this invention. For example, the comparator 86 of the pulse generator $80_a$ could be connected directly to the flip flop 92 of the control pulse forming circuit $81_a$, as indicated by the dot-and-dash line labeled 100, for direct delivery of the comparator output to the flip flop as the clock signal $V_5$, thereby forgoing the flip flop 88, inverter 89, and delay circuit 90. Also, as indicated by the dot-and-dash line 101, the comparator 75 of the tertiary voltage detector circuit 69 could be connected directly to the NOR gate 93, instead of via the flyback period pulse extractor circuit 70; that is, this circuit 70 might then be unnecessary.

Figure 11:
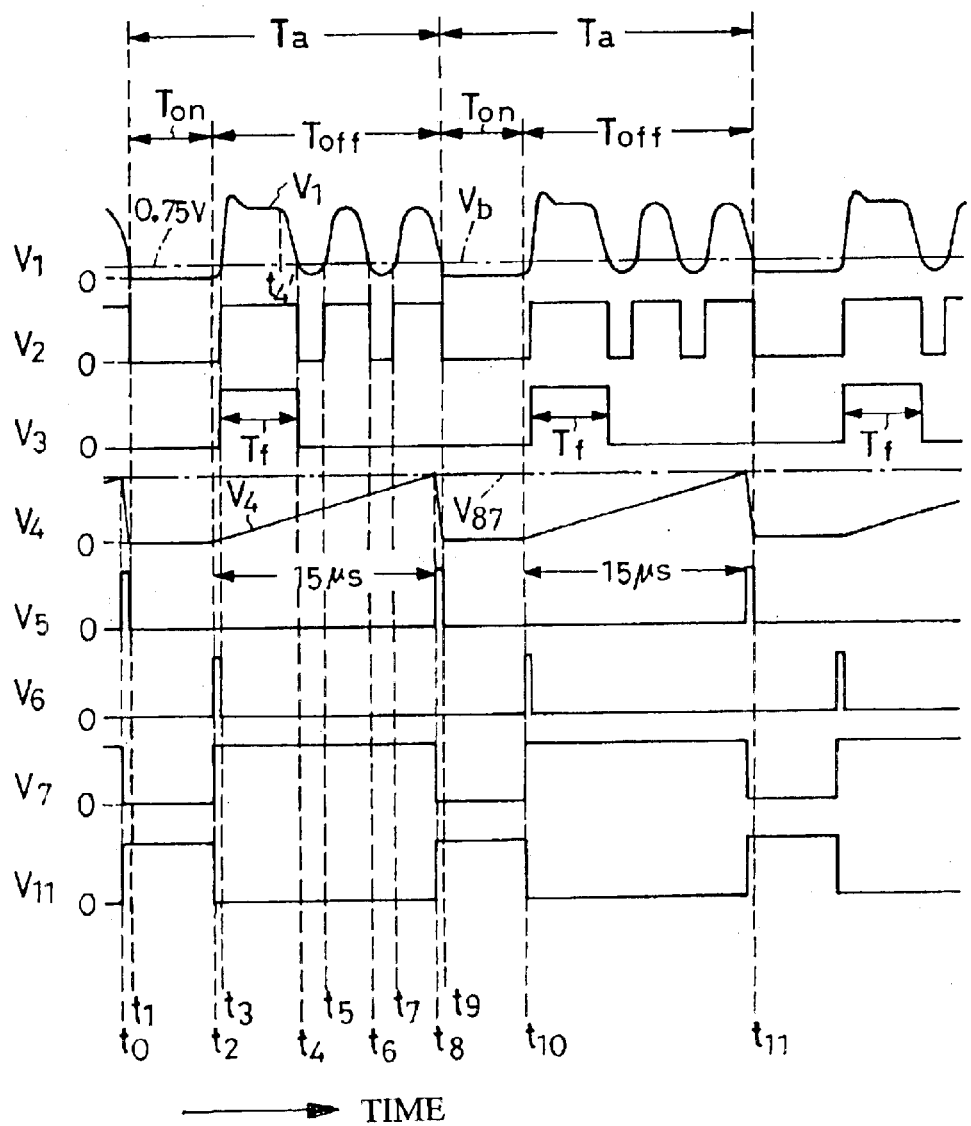
FIG. 11 is a diagram of waveforms useful in explaining the operation of the circuits of FIG. 10 in light load mode.
Figure 12:
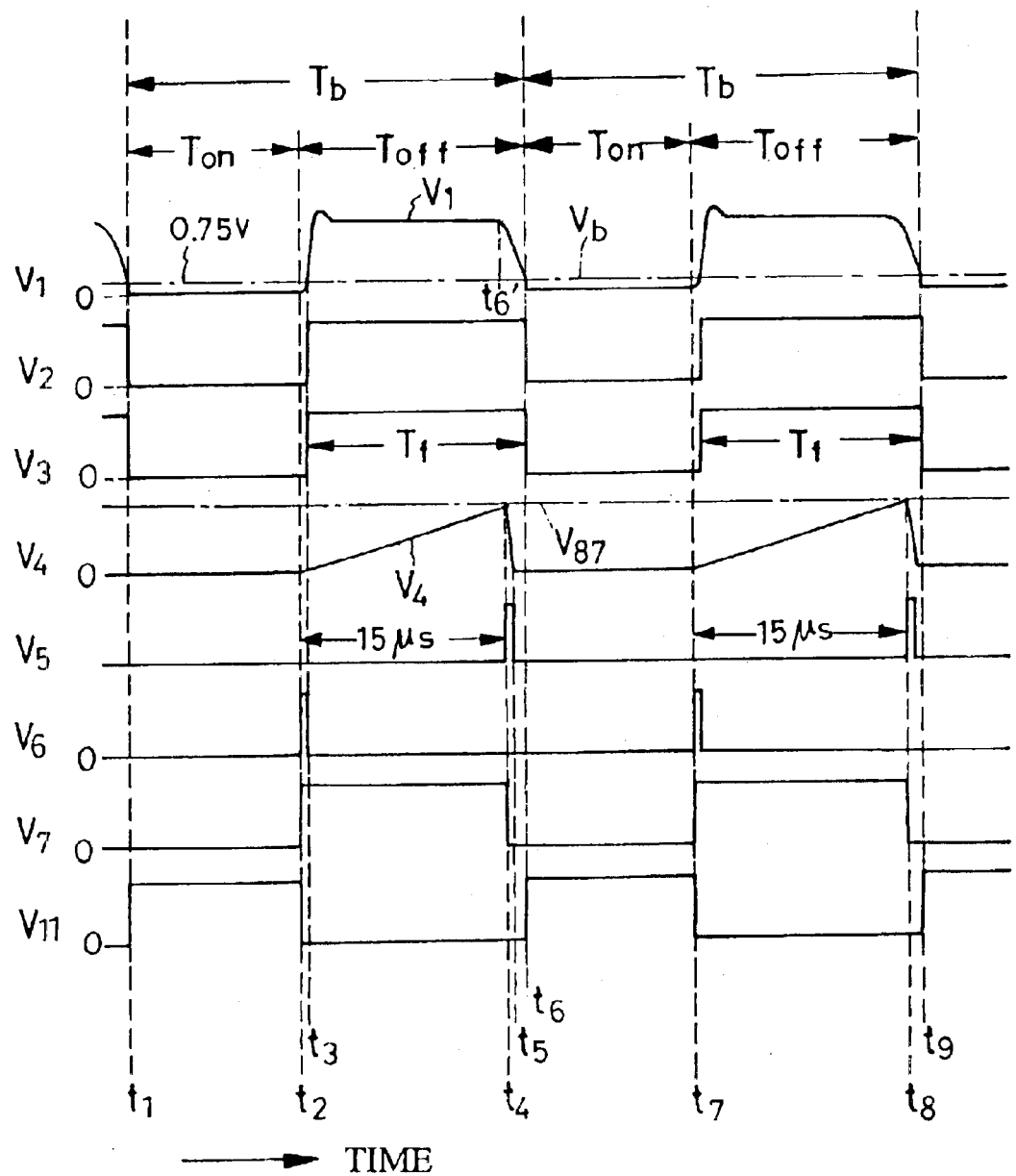
FIG. 12 is a diagram of waveforms useful in explaining the operation of the circuits of FIG. 10 in heavy load mode.

FIG. 11 is explanatory of the operation of the FIGS. 8–10 switch control circuit $7_a$ in light mode load, and FIG. 12 the operation of the same circuit $7_a$ in heavy load mode. With reference first to FIG. 11 the flip flop 92 of the control pulse forming circuit $81_a$ will be reset as at $t_2$ in this figure when the conduction termination signal $V_6$ from the conduction termination circuit $34_a$ goes high. Thereupon the inverting output Q of the reset flip flop 92 will go high, and its noninverting output Q will go low. The low output Q of the flip flop 92 will turn off the discharge switch 84 of the pulse generator $80_a$, causing the voltage $V_4$ across the capacitor 82 to rise with a gradient. When this capacitor voltage $V_4$ builds up to the reference voltage $V_{87}$, the comparator 86 will go high to set the flip flop 88. The output $V_5$ from the noninverting output Q of the flip flop 88 is shown in FIG. 11 as going high at $t_8$. The high output from the flip flop 88 of the pulse generator $80_a$ will in turn set the flip flop 92 of the switch control pulse forming circuit $81_a$. Thus the signal $V_7$ from the inverting output Q of the flip flop 92 is shown to go low at $t_8$. The NOR gate 93 will produce pulses $V_{11}$ as from $t_0$ to $t_2$ and from $t_8$ to $t_{10}$ in FIG. 11 when its two inputs $V_3$ and $V_7$ are simultaneously low.

In light load mode now under consideration, the nonconducting periods $T_{off}$ of the switch 3 are fixed at, say, 15 microseconds whereas its conducting periods $T_{on}$ are subject to change with the feedback signal $V_f$. A relatively long nonconducting period $T_{off}$ will lead to a relatively long cycle $T_a$ of on-off operation. Switchings per unit length of time will then become less as in the FIG. 1 embodiment, ultimately resulting in the higher efficiency of the converter.

In the heavy load mode depicted in FIG. 12, on the other hand, the moment $t_2$ when the voltage $V_4$ across the capacitor 82 builds up to the reference voltage $V_{87}$ comes earlier than the trailing edge $t_6$ of each flyback period detect pulse $V_3$. As a consequence, the output $V_{11}$ from the NOR gate 93 does not go high at $t_4$ even though the output $V_7$ from the inverting output of the flip flop 92 goes low as this flip flop is set at that moment by the output $V_5$ from the pulse generator $80_a$. The output $V_{11}$ from the NOR gate 93 does go high, instead, at $t_6$ when the flyback period detect signal $V_3$ on the path 43 goes low. Thus, in this heavy load mode, as in the FIG. 1 embodiment, the nonconducting periods $T_{off}$ of the switch 3 depend upon the flyback period $T_f$ as represented by each flyback period detect pulse $V_3$ and change with variations of the conducting periods $T_{on}$.

The light load mode of FIG. 11 and the heavy load mode of FIG. 12 are switched from one to the other according to whether the trailing edge of each output pulse $V_7$ from the flip flop 92 of the control pulse forming circuit $81_a$ comes later, as in FIG. 11, or earlier, as in FIG. 12, than the trailing edge of one associated flyback period detect pulse $V_3$. In other words, a change in mode occurs depending upon whether the period of time (e.g. 15 microseconds) during which the voltage $V_4$ is developing across the capacitor 82, FIG. 10, of the pulse generator $80_a$ terminates earlier or later than the end of each flyback period $T_f$. The NOR gate 93 serves the dual purpose of forming the switch control pulses $V_{11}$ and of automatically switching between the light and the heavy load mode.

This second embodiment possesses the advantage of holding the nonconducting periods $T_{off}$ of the switch 3 constant in light load mode, in addition to all the advantages set forth in reference to the FIG. 1 embodiment. With the nonconducting periods $T_{off}$ fixed, and with the conducting periods $T_{on}$ varied with the power requirement of the load, the switch is driven at a variable rate in light load mode, too, resulting in the dispersion of noise frequencies.

Figure 13:
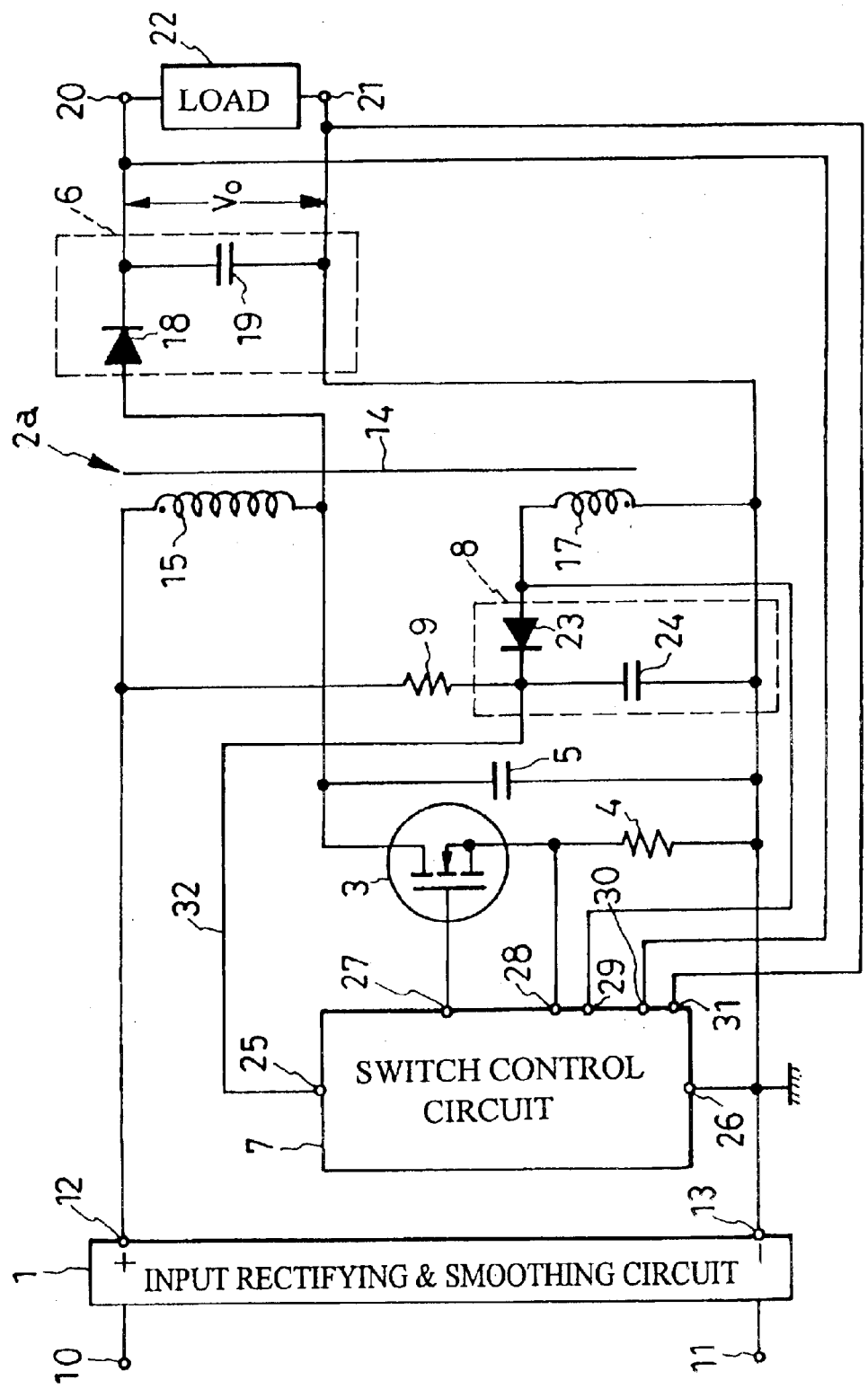
FIG. 13 is a schematic electrical diagram, partly in block form, of a further preferred form of dc-to-dc converter in accordance with the present invention.

Embodiment of FIG. 13

The third preferred form of dc-to-dc converter shown in FIG. 13 differs from the FIG. 1 converter in that the transformer 2 of the latter is replaced by an inductor $2_a$, which has no equivalent of the secondary winding 16, and that the output rectifying and smoothing circuit 6 is connected in parallel with the switch 3, all the other details of construction being alike in both embodiments.

In the operation of the FIG. 13 embodiment, the rectifying diode 18 of the output rectifying and smoothing circuit 6 will be reverse biased during the conducting periods of the switch 3, causing energy to be stored on the inductor $2_a$. The rectifying diode 18 will be forward biased during the nonconducting periods of the switch 3, with consequent energy release from the inductor $2_a$. The capacitor 19 of the output rectifying and smoothing circuit 6 will then be charged with the resultant of the voltage across the input rectifying and smoothing circuit 1 and the voltage across the inductor winding 15. In short the dc-to-dc converter of FIG. 13 constitutes a step-up switching regulator.

The switch control circuit 7 of this FIG. 13 converter is the same as that of the FIG. 1 embodiment, so that the advantages set forth in conjunction with that embodiment all apply to this embodiment as well. It is self-evident that the switch control circuit 7 is replaceable by its modification $7_a$ shown in FIG. 8.

Figure 14:
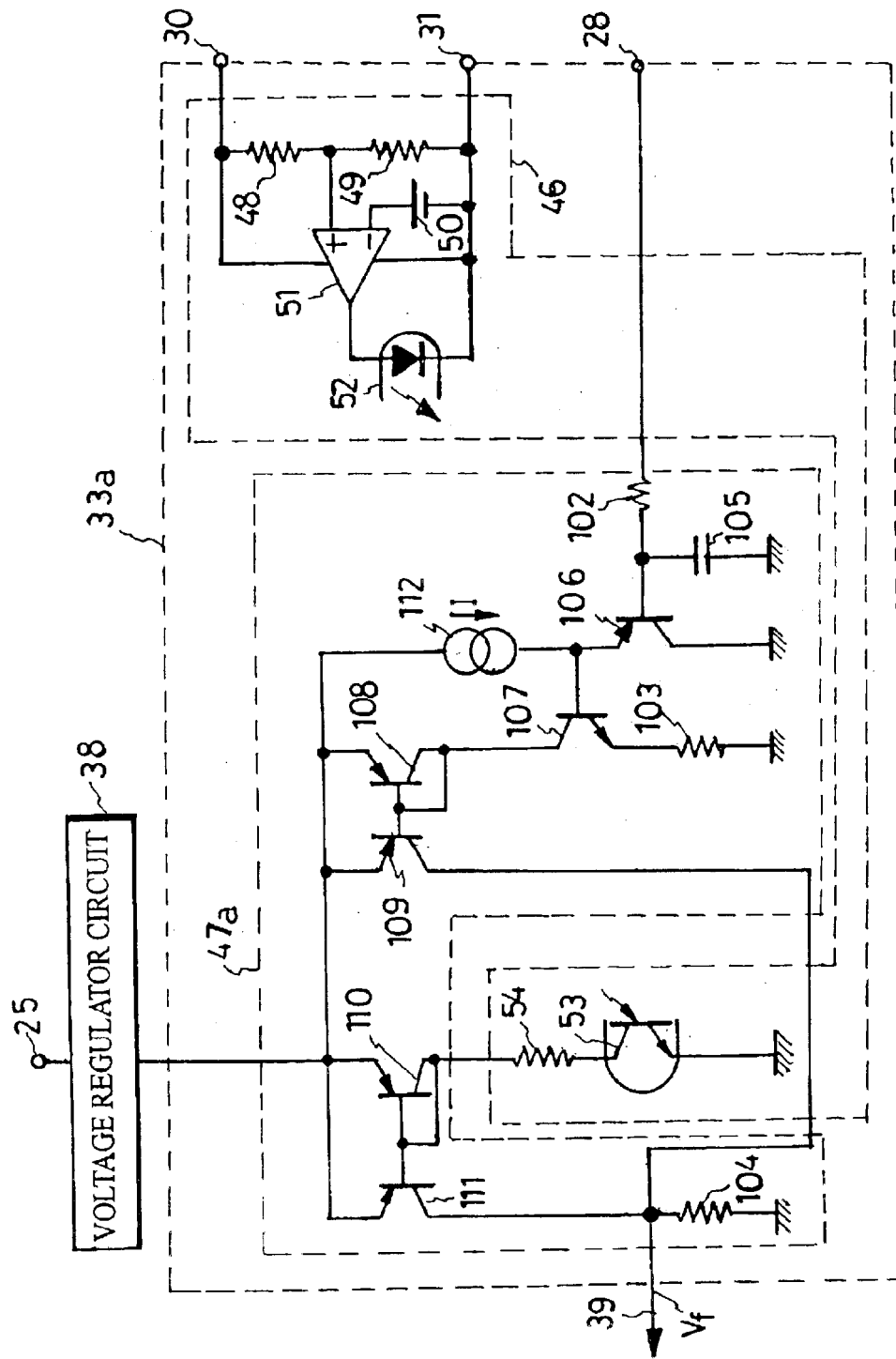
FIG. 14 is a schematic electrical diagram, partly in block form, of a still further preferred form of dc-to-dc converter in accordance with the present invention.

Embodiment of FIG. 14

FIG. 14 shows a modified feedback circuit $33_a$ for use in the FIG. 1 dc-to-dc converter in substitution for the first disclosed feedback circuit 33 shown in detail in FIG. 3. The modified feedback circuit $33_a$ broadly comprises the output voltage feedback circuit 46 and a sawtooth feedback circuit $47_a$. The output voltage feedback circuit 46 is of the same construction as its FIG. 3 counterpart except for the way the phototransistor 53 is coupled to the supply terminal 25.

The sawtooth feedback circuit $47_a$ represents a substantial alteration of the sawtooth feedback circuit 47 shown in FIG. 3. Included is a capacitor 105 which is connected via a resistor 102 to the current detect terminal 28, so that the capacitor develops a voltage in proportion with the magnitude of the current through the switch 3, FIG. 1. A pnp transistor 106 has its base connected to the capacitor 105, its emitter to a voltage regulator circuit 38 via a constant-current regulator 112, and its collector grounded. The current through this transistor 106 is inversely proportional in magnitude to the current through the switch 3. An npn transistor 107 has its base connected to the constant-current regulator 112, its collector to the voltage regulator circuit 38 via another pnp transistor 108, and its emitter grounded via a resistor 103. A current flows through the second transistor 107 in proportion with the current through the switch 3.

The third recited transistor 108 has its emitter connected to the voltage regulator circuit 38, its collector to the second transistor 107, and its base both to its own collector and to the base of a fourth transistor 109 of pnp type. The fourth transistor 109 has its emitter connected to the voltage regulator circuit 38, its collector grounded via a resistor 104, and its base connected to the base of the third transistor 108. The currents through these third 108 and fourth 109 transistors are proportional with the current through the switch 3.

The sawtooth feedback circuit $47_a$ additionally comprises a fifth 110 and a sixth 111 transistor which are both of pnp type. The fifth transistor 110 has its emitter connected to the voltage regulator circuit 38, its collector to the phototransistor 53 of the output voltage feedback circuit 46 via the resistor 54, and its base both to its own collector and to the base of the sixth transistor 111. The sixth transistor 111 has its emitter connected to the voltage regulator circuit 38, its collector grounded via the resistor 104, and its base connected to the base of the fifth transistor 110. The currents through these transistors 110 and 111 have a value proportional to the converter output voltage $V_0$ between the pair of converter output voltage detect terminals 30 and 31.

There flows through the resistor 104 the resultant of the current in proportion with the current through the switch 3 and the current in proportion with the converter output voltage $V_0$. Thus the sawtoothed feedback signal $V_f$ representative of the resultant of the current detect signal and voltage detect signal is obtained as in the FIG. 1 embodiment, for delivery to the conduction termination circuit 34, FIG. 2, over the signal path 39 connected to the junction between resistor 104 and transistor 111.

Possible Modifications

Not withstanding the foregoing detailed disclosure it is not desired that the present invention be limited by the particulars of the illustrated embodiment. The following is a brief list of possible modifications of the embodiments which are all believed to fall within the scope of the invention as expressed in the appended claims:

1. The invention could be embodied in a so-called "forward" dc-to-dc converter such that the transformer secondary 16, FIG. 1, was so polarized as to cause conduction through the diode 18 when the switch 3 was closed.
2. The output voltage feedback circuit 46, FIG. 3, could be coupled to the control power supply circuit 8, FIG. 1, instead of to the output rectifying and smoothing circuit 6. Being connected in parallel with the transformer tertiary 17, the control power supply circuit 8 provides information on the converter output voltage $V_O$.
3. The switch 3 could take the form of semiconductor switches other than an FET, such as a bipolar transistor or an insulated-gate bipolar transistor.
4. An electric connection could be employed in lieu of the optical coupling of the LED 25 and phototransistor 47.
5. A magnetoelectric converter such as a Hall generator could be used in place of the current detect resistor 4, FIG. 1.
6. The flyback period detector circuit 35, FIG. 2, could be connected between the terminals of the switch 3.
7. The sawtooth feedback circuit 47, FIGS. 3 and 9, could be disconnected from the current detect terminal 28, in which case the capacitor 56 would provide the sawtoothed feedback signal $V_f$ by being charged only by the output current of the output voltage feedback circuit 46.

What is claimed is:

1. A dc-to-dc converter capable of translating a first dc voltage into a second dc voltage for application to a load of variable power requirement, the dc-to-dc converter comprising:
   (a) a pair of dc terminals for providing a first dc voltage;
   (b) a controllable switching device connected between the pair of dc terminals and driven to have alternating conducting and nonconducting periods for repeatedly interrupting the first dc voltage;
   (c) inductance means connected in series with the switching device;
   (d) a rectifying and smoothing circuit connected to the inductance means for providing a second dc voltage to be applied to a load;
   (e) a flyback period detector circuit for providing an output signal indicative of a period of time during which the inductance means is developing a flyback voltage;
   (f) a feedback circuit for creating a feedback signal for holding the second dc voltage constant;
   (g) a conduction termination circuit connected to the feedback circuit for determination of moments at which the conducting periods of the switching device are to be terminated;
   (h) a switch control and mode select circuit connected to the flyback period detector circuit, the conduction termination circuit, and the switching device, for driving the switching device in two different modes, the switch control and mode select circuit having a pulse generator circuit for providing clock pulses, and means for forming a first switch control signal for driving the switching device in first mode when the flyback voltage terminates earlier than each clock pulse, and forming a second switch control signal for driving the switching device in second mode, in which each on-off cycle of the switching device is longer than in the first mode, when the flyback voltage terminates later than each clock pulse.

2. A dc-to-dc converter as defined in claim 1, wherein the feedback circuit comprises:
   (a) an output voltage feedback circuit for creating a voltage signal indicative of the second dc voltage; and
   (b) a sawtooth feedback circuit connected to the output voltage feedback circuit for providing the feedback signal in the form of a sawtooth wave having an amplitude controlled by the voltage signal.

3. A dc-to-dc converter as defined in claim 2, further comprising current detector means for detecting current flowing through the switching device, the sawtooth feedback circuit being connected to the current detector means for providing the feedback signal by combining outputs from the output voltage feedback circuit and the current detector means.

4. A dc-to-dc converter as defined in claim 2, wherein the conduction termination circuit comprises:
   (a) a reference signal generator circuit for providing a reference signal; and
   (b) a comparator having a first input connected to the feedback circuit, and a second input connected to the reference signal generator circuit, for providing pulses indicative of the ends of the conducting periods of the switching device.

5. A dc-to-dc converter as defined in claim 1, wherein the flyback period detector circuit comprises means for providing pulses having a duration indicative of the period of time during which the flyback voltage is being generated.

6. A dc-to-dc converter as defined in claim 5, wherein the flyback period detector circuit comprises:
   (a) switch voltage detector means for providing a switch voltage detect signal indicative of a voltage across the switching device;
   (b) a source of a reference voltage indicative of a value less than an expected maximum value of the voltage across the switching device;
   (c) a comparator having a first input connected to the switch voltage detector means, and a second input connected to the reference voltage source, for providing pulses each having a duration indicative of the period of time during which the switch voltage detect signal is higher than the reference voltage; and
   (d) a pulse extractor circuit having a first input connected to the comparator, and a second input connected to the conduction termination circuit, for extracting, as a flyback period detect signal indicative of the duration of the flyback voltage, a pulse that is first produced by the comparator during each nonconducting period of the switch.

7. A dc-to-dc converter as defined in claim 1, wherein the pulse generator circuit of the switch control and mode select circuit comprises means for generating the clock pulses with a constant pulses in the first mode, and, in the second mode, with a period that varies in proportion with each conducting period of the switching device.

8. A dc-to-dc converter as defined in claim 7, wherein the switch control and mode select circuit comprises:
  (a) a capacitor for providing a sawtooth voltage;
  (b) a constant-current regulator circuit connected to the capacitor for charging the same;
  (c) a source of a reference voltage;
  (d) a comparator having a first input connected to the capacitor, and a second input connected to the reference voltage source, for generating a clock pulse each time a voltage across the capacitor builds up to the reference voltage;
  (e) a first discharge switch connected in parallel with the capacitor for causing the same to discharge, the first discharge switch having a control terminal connected to the comparator;
  (f) an RS flip flop having a set input connected to the comparator and a reset input connected to the conduction termination circuit;
  (g) a first logic circuit having a first input connected to the comparator, and a second input connected to the flip flop, for providing an output signal that is high both during the durations of the clock pulses and when the flip flop is reset;
  (h) a second logic circuit having a first input connected to the first logic circuit, and a second input connected to the flyback period detector circuit, for providing an output signal that is high when the output signal of the first logic circuit is low and, at the same time, when the output signal of the flyback period detector circuit indicates the duration of the flyback voltage;
  (i) a second discharge switch connected in parallel with the capacitor for holding the same in a state of discharge in order to delay the commencement of subsequent charging, the second discharge switch having a control terminal connected to the second logic circuit; and
  (j) a third logic circuit having a first input connected to the first logic circuit, and a second input connected to the second logic circuit, for causing conduction through the switching device when the outputs from the first and the second logic circuit are both low.

9. A dc-to-dc converter as defined in claim 8, wherein the switch control and mode select circuit further comprises pulse generator means connected between the comparator and the control terminal of the first discharge switch for forming pulses of prescribed duration in response to each output pulse from the comparator.

10. A dc-to-dc converter as defined in claim 1, wherein the pulse generator circuit of the switch control and mode select circuit comprises means for generating the clock pulses which, in the first mode, have a cycle equal to the sum of each conducting period and each nonconducting period, which is fixed, of the switching device, and which, in the second mode, have a cycle subject to change in proportion with the conducting periods of the switching device.

11. A dc-to-dc converter as defined in claim 10, wherein the switch control and mode select circuit comprises:
  (a) a capacitor for providing a sawtooth voltage;
  (b) a constant-current regulator circuit connected to the capacitor for charging the same;
  (c) a source of a reference voltage;
  (d) a comparator having a first input connected to the capacitor, and a second input connected to the reference voltage source, for generating a clock pulse each time a voltage across the capacitor builds up to the reference voltage;
  (e) an RS flip flop having a set input connected to the comparator and a reset input connected to the conduction termination circuit;
  (f) a discharge switch connected in parallel with the capacitor for causing the same to discharge, the discharge switch having a control terminal connected to the flip flop so as to conduct when the flip flop is set; and
  (g) a logic circuit having a first input connected to the flip flop, and a second input connected to the flyback period detector circuit, for causing conduction through the switching device when outputs from the flip flop and the flyback period detector circuit are both low.

12. A dc-to-dc converter as defined in claim 10, wherein the flyback period detector circuit comprises:
  (a) switch voltage detector means for providing a switch voltage detect signal indicative of a voltage across the switching device;
  (b) a source of a reference voltage having a value less than an expected maximum value of the voltage across the switching device; and
  (c) a comparator having a first input connected to the switch voltage detector means, and a second input connected to the reference voltage source, for providing pulses each having a duration indicative of the period of time during which the switch voltage detect signal is higher than the reference voltage;
and wherein the switch control and mode select circuit comprises:
  (a) a capacitor for providing a sawtooth voltage;
  (b) a constant-current regulator circuit connected to the capacitor for charging the same;
  (c) a source of a reference voltage;
  (d) a comparator having a first input connected to the capacitor, and a second input connected to the reference voltage source, for generating a clock pulse each time a voltage across the capacitor builds up to the reference voltage;
  (e) an RS flip flop having a set input connected to the comparator and a reset input connected to the conduction termination circuit;
  (f) a discharge switch connected in parallel with the capacitor for causing the same to discharge, the discharge switch having a control terminal connected to the flip flop so as to conduct when the flip flop is set; and
  (g) a logic circuit having a first input connected to the flip flop, and a second input connected to the comparator of the flyback period detector circuit, for causing conduction through the switching device when outputs from the flip flop and the comparator of the flyback period detector circuit are both low.

13. A dc-to-dc converter as defined in claim 11, wherein the switch control and mode select circuit further comprises pulse generator means connected between the comparator of the switch control and mode select circuit and the set input of the flip flop forming pulses having a prescribed duration in response to each output pulse from the comparator of the switch control and mode select circuit.

14. A dc-to-dc converter as defined in claim 1, further comprising resonance capacitance means connected in parallel with the switching device for reduction of switching loss when the switching device is turned off.

15. A dc-to-dc converter as defined in claim 3, wherein the voltage feedback circuit comprises:

(a) output voltage detector means connected to the rectifying and smoothing circuit for providing an output signal indicative of the second dc voltage; and (b) voltage-to-current converter means for providing a current signal corresponding to the output signal of the output voltage detector means;

and wherein the current detector means comprises:

(a) a current detect resistor connected in series with the switching device; and (b) a current detect terminal connected to the current detect resistor for detecting a voltage across the same.

16. A dc-to-dc converter as defined in claim 15, wherein the sawtooth feedback circuit comprises:

(a) a capacitor connected to the voltage-to-current converter means for providing the sawtooth feedback signal;

(b) a resistor connected between the current detect terminal and the capacitor; and (c) discharge means connected in parallel with the capacitor, the discharge means having an input connected to the switch control and mode select circuit for causing the capacitor to discharge during the conducting periods of the switching device.

17. A dc-to-dc converter as defined in claim 15, wherein the sawtooth feedback circuit comprises:

(a) a resistor for providing the sawtooth feedback signal;

(b) current supply means connected between the voltage-to-current converter means and the resistor for supplying to the resistor a current corresponding to the current signal from the voltage-to-current converter means; and (c) second voltage-to-current converter means connected between the current detect terminal and the resistor for supplying to the latter a current corresponding to the voltage detected by the current detect terminal.

* * * * *

UNITED STATES PATENT AND TRADEMARK OFFICE
CERTIFICATE OF CORRECTION

| | |
|---|---|
| PATENT NO. | : 6,842,350 B2 |
| APPLICATION NO. | : 10/858432 |
| DATED | : January 11, 2005 |
| INVENTOR(S) | : Yamada et al. |

It is certified that error appears in the above-identified patent and that said Letters Patent is hereby corrected as shown below:

On the Cover Page:

Please add the following Foreign Patent Documents:
--JP    09-201053    07/1997
  JP    2001-231257  08/2001--

Column 8:
Line 38, delete "$I_v$;" and insert therefor -- $I_i$ --.

Column 9:
Line 23, delete "66." and insert therefor -- 66 --.

Column 11:
Line 40, delete "Qconnected" and insert therefor -- $\overline{Q}$ connected --.
Line 47, delete "Qof" and insert therefor -- $\overline{Q}$ of --.

Column 13:
Line 40, delete "fro" and insert therefor -- from --.

Column 16:
Line 35, delete "Qof" and insert therefor -- $\overline{Q}$ of --.
Line 61, delete "Qof" and insert therefor -- $\overline{Q}$ of --.

Signed and Sealed this

Eighteenth Day of September, 2007

JON W. DUDAS
*Director of the United States Patent and Trademark Office*